(12) United States Patent
Chang et al.

(10) Patent No.: US 8,077,280 B2
(45) Date of Patent: Dec. 13, 2011

(54) THIN FILM TRANSISTOR SUBSTRATE OF HORIZONTAL ELECTRIC FIELD TYPE LIQUID CRYSTAL DISPLAY DEVICE AND FABRICATING METHOD THEREOF

(75) Inventors: Youn Gyoung Chang, Gyeonggi-do (KR); Heung Lyul Cho, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1519 days.

(21) Appl. No.: 10/978,533

(22) Filed: Nov. 2, 2004

(65) Prior Publication Data
US 2005/0110932 A1    May 26, 2005

(30) Foreign Application Priority Data
Nov. 4, 2003   (KR) .................. 10-2003-0077664

(51) Int. Cl.
*G02F 1/1343* (2006.01)
*H01L 29/10* (2006.01)
(52) U.S. Cl. ............. 349/141; 349/144; 257/59; 257/72
(58) Field of Classification Search ............... 257/59, 257/72; 349/141, 142, 144
See application file for complete search history.

(56) References Cited

U.S. PATENT DOCUMENTS

| | | | |
|---|---|---|---|
| 6,208,399 B1 * | 3/2001 | Ohta et al. | 349/139 |
| 6,894,753 B2 * | 5/2005 | Song et al. | 349/129 |
| 2001/0022633 A1 * | 9/2001 | Kwak et al. | 349/43 |
| 2002/0093614 A1 * | 7/2002 | Moon et al. | 349/141 |
| 2003/0197182 A1 | 10/2003 | Kim et al. | |
| 2006/0186411 A1 | 8/2006 | Kim et al. | |

FOREIGN PATENT DOCUMENTS

| | | |
|---|---|---|
| KR | 2000-0033515 | 6/2000 |
| KR | 2003-0082647 | 10/2003 |

* cited by examiner

*Primary Examiner* — Kenneth Parker
*Assistant Examiner* — Jose R Diaz
(74) *Attorney, Agent, or Firm* — Morgan, Lewis & Bockius LLP

(57) ABSTRACT

A thin film transistor substrate of horizontal electric field type liquid crystal display device includes: a gate line and a common line arranged in parallel on a substrate and formed from a first conductive layer; a data line formed from a second conductive layer, the data line crossing the gate line and the common line having a gate insulating film therebetween such that the data line, the gate line and the common line define a pixel area; a thin film transistor having a gate connected to the gate line and a source electrode connected to the data line; a common electrode extending from the common line into the pixel area and formed from the first conductive layer; a protective film for covering a plurality of signal lines and electrodes and the thin film transistor; a pixel hole in the protective film having an elongated shape that parallels the common electrode; and a pixel electrode connected to a side surface of a drain electrode of the thin film transistor and formed from a third conductive layer within the pixel hole.

7 Claims, 22 Drawing Sheets

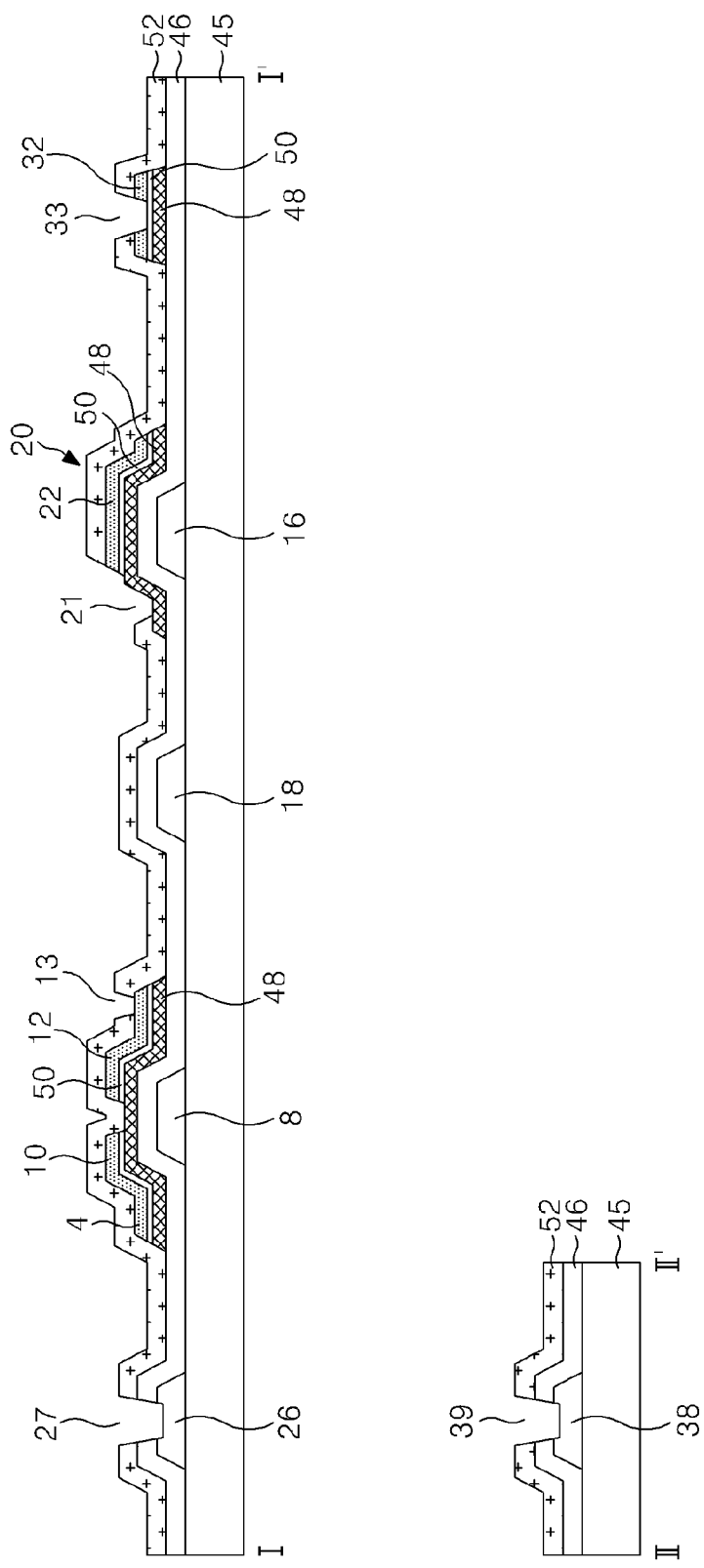

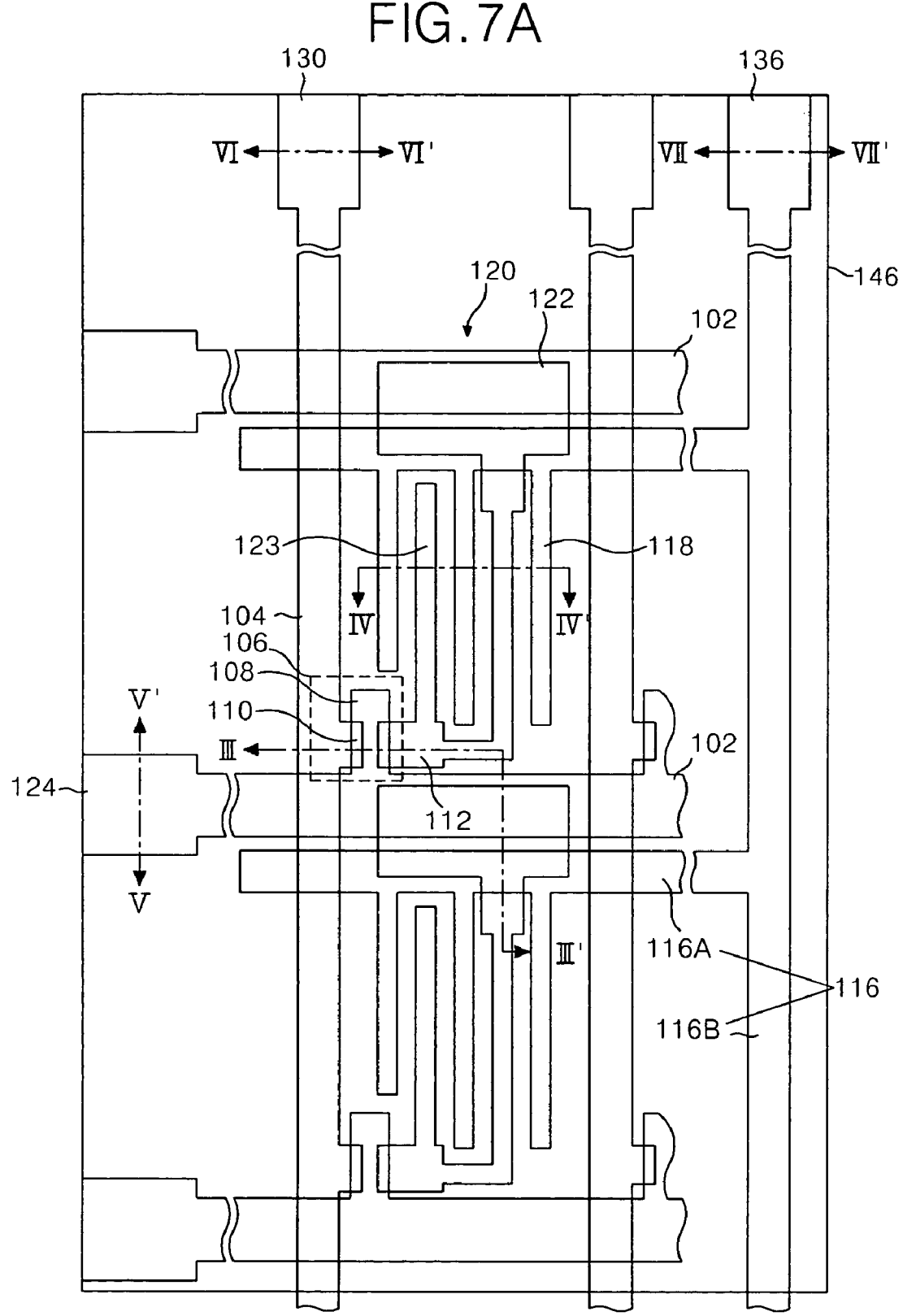

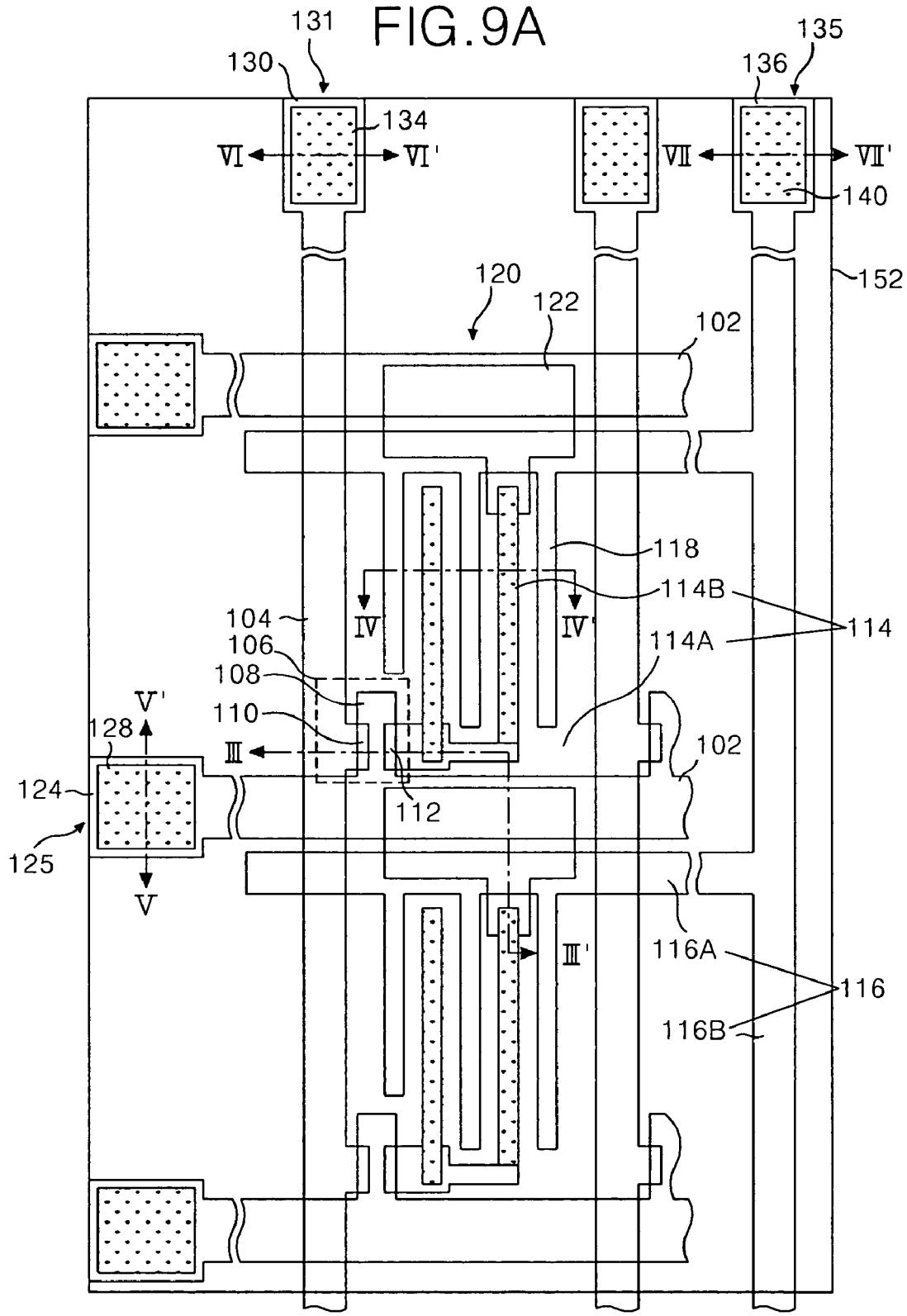

THIN FILM TRANSISTOR SUBSTRATE OF HORIZONTAL ELECTRIC FIELD TYPE LIQUID CRYSTAL DISPLAY DEVICE AND FABRICATING METHOD THEREOF

This application claims the benefit of Korea Patent Application No. 2003-77664 filed on Nov. 4, 2003, which is hereby incorporated by reference.

BACKGROUND OF THE INVENTION

1. Field of the Invention

The present invention relates to a liquid crystal display, and more particularly to a thin film transistor substrate of a horizontal electric field type liquid crystal display device and a fabricating method thereof.

2. Description of the Related Art

Generally, liquid crystal displays (LCD) control light transmittance of liquid crystal using an electric field to, thereby display a picture. The liquid crystal displays are largely classified into a vertical electric field type and a horizontal electric field type depending upon the direction of the electric field driving the liquid crystal. The vertical electric field type drives a liquid crystal in a twisted nematic (TN) mode with a vertical electric field formed between a pixel electrode and a common electrode arranged in opposition to each other on the upper and lower substrates. The vertical electric field type has the advantage of a large aperture ratio while having the drawback of a narrow viewing angle of about 90°. The horizontal electric field type drives a liquid crystal in an in plane switch (IPS) mode with a horizontal electric field between the pixel electrode and the common electrode arranged in parallel to each other on the lower substrate. The horizontal electric field type has the advantage of a wide viewing angle of about 160°. Hereinafter, the liquid crystal display of horizontal electric field type will be described in detail.

The horizontal electric field type includes a thin film transistor array substrate (i.e., a lower substrate) and a color filter substrate (i.e., an upper substrate) that oppose each other and are joined to each other. A spacer is positioned between the two substrates to uniformly maintaining a cell gap between the two substrates. A liquid crystal material fills the cell gap between the two substrates. The thin film transistor array substrate includes a plurality of signal wirings for forming a horizontal electric field in each pixel, a plurality of thin film transistors and an alignment film for aligning the liquid crystal. The color filter substrate includes a color filter for implementing a color, a black matrix for preventing light leakage and an alignment film for aligning the liquid crystal.

In a horizontal electric field type liquid crystal display, the complicated fabrication of the thin film transistor substrate is a major cost factor in the manufacturing of the liquid crystal display panel because it involves a plurality of masking processes. For example, one mask process includes a lot of processes, such as thin film deposition, cleaning, photolithography, etching, photo-resist stripping and inspection processes. In order to address this issue, thin film transistor substrates have been developed that can be produced with the reduced number of masking processes. Recently, a four-mask process that excludes one mask process from the standard five-mask process has been developed.

FIG. 1 is a plan view showing a structure of a thin film transistor substrate of a horizontal electric field type liquid crystal display made using the related art four-mask process. FIG. 2 is a cross-sectional view of the thin film transistor substrate taken along the line I-I' and the line II-II' in FIG. 1.

As shown in FIG. 1 and FIG. 2, the thin film transistor substrate includes a gate line 2 and a data line 4 provided on a lower substrate 45 in such a manner as to cross each other with a gate insulating film 46 therebetween. A thin film transistor 6 is adjacent to each crossing. A pixel electrode 14 and a common electrode 18 are provided at a pixel area, which is defined by the gate line 2 and the data line 4 for the purpose of forming a horizontal field. A common line 16 is connected to the common electrode 18. The thin film transistor substrate also includes a storage capacitor 20 provided at an overlap portion between the pixel electrode 14 and the common line 16. Further, a gate pad 24 is connected to the gate line 2, a data pad 30 is connected to the data line 4 and a common pad 36 is connected to the common line 16. The gate line 2 supplies a gate signal to the pixel area 5 and the data line 4 supplies a data signal to the pixel area 5. The common line 16 supplies a reference voltage for driving the liquid crystal and is provided on one side of the pixel area 5 in parallel with the gate line 2 on the other side of the pixel area 5.

The thin film transistor 6 allows the pixel signal of the data line 4 to be charged and maintained on the pixel electrode 14 in response to the gate signal of the gate line 2. The thin film transistor 6 includes a gate electrode 8 connected to the gate line 2, a source electrode 10 connected to the data line 4, and a drain electrode 12 connected to the pixel electrode 14. Further, the thin film transistor 6 includes an active layer 48 defining a channel between the source electrode 10 and the drain electrode 12. The active layer 48 overlaps a gate insulating film 46 on the gate electrode 8.

The active layer 48 also overlaps the data line 4, lower data pad electrode 32 and upper storage electrode 22. An ohmic contact layer 50 for making an ohmic contact with the data line 4 is provided on the active layer 48. In addition, the source electrode 10, the drain electrode 12, the lower data pad electrode 32 and the upper storage electrode 22 are also provided on the active layer 48.

The pixel electrode 14 is connected, via a first contact hole 13 through a protective film 52, to the drain electrode 12 of the thin film transistor 6 and is provided within the pixel area 5. The pixel electrode 14 includes a first horizontal part 14A connected to the drain electrode 12 and provided in parallel with adjacent gate lines 2, a second horizontal part 14B overlapping the common line 16, and a finger part 14C provided in parallel between the first and second horizontal parts 14A and 14B.

The common electrode 18 is connected to the common line 16 and is provided within the pixel area 5. Specifically, the common electrode 18 is provided in parallel with the finger part 14C of the pixel electrode 14 within the pixel area 5. Accordingly, a horizontal electric field can be formed between the pixel electrode 14 to which a pixel signal is supplied via the thin film transistor 6 and the common electrode 18 to which a reference voltage is supplied via the common line 16. As a result, a horizontal electric field can be formed between the finger part 14C of the pixel electrode 14 and the common electrode 18. Liquid crystal molecules arranged in the horizontal direction between the thin film transistor substrate and the color filter substrate by such a horizontal electric field are rotated due to the dielectric anisotropy. Transmittance of a light transmitting the pixel area 5 is differentiated depending upon a rotation extent of the liquid crystal molecules, thereby implementing a gray level scale.

The storage capacitor 20 includes an upper storage electrode 22 overlapping the common line 16 with the gate insulating film 46, the active layer 48 and the ohmic contact layer 50 therebetween. The storage capacitor 20 further includes a pixel electrode 14 connected, via a second contact hole 21 provided in the protective film 52, to the upper storage electrode 22. The storage capacitor 20 allows a pixel signal charged on the pixel electrode 14 to be stably maintained until the next pixel signal is charged.

The gate line 2 is connected, via the gate pad 24, to a gate driver (not shown). The gate pad 24 consists of a lower gate pad electrode 26 extending from the gate line 2 and an upper gate pad electrode 28 connected, via a third contact hole 27 through the gate insulating film 46 and the protective film 52, to the lower gate pad electrode 26. The data line 4 is connected via the data pad 30 to the data driver (not shown). The data pad 30 consists of a lower data pad electrode 32 extending from the data line 4 and an upper data pad electrode 34 connected, via a fourth contact hole 33 through the protective film 52, to the lower data pad electrode 32. The common line 16 receives a reference voltage from an external reference voltage source (not shown) through the common pad 36. The common pad 36 includes a lower common pad electrode 38 extending from the common line 16 and an upper common pad electrode 40 connected, via a fifth contact hole 39 through the gate insulating film 46 and the protective film 52, to the lower common pad electrode 38.

A method of fabricating the thin film transistor substrate having the above-mentioned structure using the four-round mask process will be described in detail with reference to FIGS. 3A to 3D. Referring to FIG. 3A, a gate metal pattern group including the gate line 2, the gate electrode 8 and the lower gate pad electrode 26, the common line 16, the common electrode 18 and the—lower common pad electrode 38—is provided on the lower substrate 45 by a first mask process.

The gate metal pattern group is formed by first forming a gate metal layer on the upper substrate 45 by a deposition technique, such as sputtering. Then, the gate metal layer is patterned by photolithography and an etching process using a first mask, to thereby form the gate metal pattern group including the gate line 2, the gate electrode 8, the lower gate pad electrode 26, the common line 16, common electrode 18 and the lower common pad electrode 38. The gate metal layer is formed from a metal, such as aluminum-alloy, chrome (Cr) or molybdenum (Mo).

Referring to FIG. 3B, the gate insulating film 46 is coated onto the lower substrate 45 provided with the gate metal pattern group. Further, a semiconductor pattern including the active layer 48 and the ohmic contact layer 50, and a source/drain metal pattern group including the data line 4, the source electrode 10, the drain electrode 12, the lower data pad electrode 32 and the upper storage electrode 22 are provided on the gate insulating film 46 by a second mask process. More specifically, the gate insulating film 46, an amorphous silicon layer, an n+ amorphous silicon layer and a source/drain metal layer are sequentially provided over the lower substrate 45 having the gate metal pattern group by the appropriate deposition techniques, such as plasma enhanced chemical vapor deposition (PECVD) and/or sputtering. Herein, the gate insulating film 46 is formed from an inorganic insulating material, such as silicon nitride ($SiN_x$) or silicon oxide ($SiO_x$). The source/drain metal is made from molybdenum (Mo), titanium (Ti), tantalum (Ta) or a molybdenum alloy.

Then, a photo-resist pattern is formed on the source/drain metal layer by the photolithography using the second mask. In this case, a diffractive exposure mask having a diffractive exposing part corresponding to a channel portion of the thin film transistor is used as the second mask, thereby allowing a photo-resist pattern of the channel portion to have a height lower than other pattern portions.

Subsequently, the source/drain metal layer is patterned by a wet etching process using the photo-resist pattern, to thereby define the source/drain metal pattern group including the data line 4, the source electrode 10, the drain electrode 12 being integral to the source electrode 10 and the upper storage electrode 22.

Next, the photo-resist pattern having a relatively low height is removed from the channel portion by an ashing process and thereafter the source/drain metal pattern and the ohmic contact layer 50 of the channel portion are etched by a dry etching process. Thus, the active layer 48 of the channel portion is exposed to disconnect the source electrode 10 from the drain electrode 12. Then, the photo-resist pattern remaining on the source/drain metal pattern group is removed by a stripping process.

Referring to FIG. 3C, the protective film 52 includes first to fifth contact holes 13, 21, 27, 33 and 39 formed in the gate insulating film 46 by a third mask process. More specifically, the protective film 52 is deposited over the entire surface of the source/drain metal pattern group by a deposition technique, such as plasma enhanced chemical vapor deposition (PECVD). The protective film 52 is patterned by a photolithography and etching process using a third mask to define the first to fifth contact holes 13, 21, 27, 33 and 39. The first contact hole 13 passes through the protective film 52 to expose the drain electrode 12. The second contact hole 21 passes through the protective film 52 to expose the upper storage electrode 22. The third contact hole 27 passes through the protective film 52 and the gate insulating film 46 to expose the lower gate pad electrode 26. The fourth contact hole 32 passes through the protective film 52 to expose the lower data pad electrode 32. The fifth contact hole 30 passes through the protective film 52 and the gate insulating film 48 to expose the lower common pad electrode 38. If the source/drain metal is formed from a metal having a high dry-etching ratio, such as molybdenum (Mo), then the first, second and fourth contact holes 13, 21 and 33 will respectively pass through the drain electrode 12, the upper storage electrode 22 and the lower data pad electrode 32 so as to expose side surfaces of these electrodes. The protective film 50 is formed from an inorganic material identical to the gate insulating film 46, or an organic material having a low dielectric constant, such as an acrylic organic compound, BCB (benzocyclobutene) or PFCB (perfluorocyclobutane).

Referring to FIG. 3D, a transparent conductive film pattern group including the pixel electrode 14, the upper gate pad electrode 28, the upper data pad electrode 34 and the upper common pad electrode 40 are provided on the protective film 52 by a fourth mask process. More specifically, a transparent conductive film is coated onto the protective film 52 by a deposition technique, such as sputtering. Then, the transparent conductive film is patterned by a photolithography and etching process using the fourth mask to form the transparent conductive pattern group including the pixel electrode 14, the upper gate pad electrode 28, the upper data pad electrode 34 and the upper common pad electrode 40. The pixel electrode 14 is electrically connected, via the first contact hole 13, to the drain electrode 12 while also being electrically connected, via the second contact hole 21, to the upper storage electrode 22. The upper gate pad electrode 28 is electrically connected, via the third contact hole 37, to the lower gate pad electrode 26. The upper data pad electrode 34 is electrically connected, via the fourth contact hole 33, to the lower data pad electrode 32. The upper common pad electrode 40 is electrically connected, via the fifth contact hole 39, to the lower common pad electrode 38. The transparent conductive film is formed from indium-tin-oxide (ITO), tin-oxide (TO) or indium-zinc-oxide (IZO).

The related art thin film transistor substrate of horizontal electric field type and the fabricating method thereof as mentioned above uses a four-round mask process, thereby reducing the number of fabricating processes and hence reducing manufacturing cost in comparison with those using the five-round mask process. However, since the four-round mask process still is a complicated fabricating process. Thus, the cost reduction is limited. There is still a need to simplify the fabricating process and reduce the manufacturing cost.

SUMMARY OF THE INVENTION

Accordingly, the present invention is directed to a thin film transistor substrate of a horizontal electric field type liquid crystal display device and a fabricating method thereof that substantially obviates one or more of the problems due to limitations and disadvantages of the related art.

Accordingly, it is an object of the present invention to provide a thin film transistor substrate of a horizontal electric field type liquid crystal display device and a fabricating method thereof that is capable of being manufactured by a three-round mask process using a lift-off process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other objects of the invention, a thin film transistor substrate of horizontal electric field type liquid crystal display device includes: a gate line and a common line arranged in parallel on a substrate and formed from a first conductive layer; a data line formed from a second conductive layer, the data line crossing the gate line and the common line having a gate insulating film therebetween such that the data line, the gate line and the common line define a pixel area; a thin film transistor having a gate connected to the gate line and a source electrode connected to the data line; a common electrode extending from the common line into the pixel area and formed from the first conductive layer; a protective film for covering a plurality of signal lines and electrodes and the thin film transistor; a pixel hole in the protective film having an elongated shape that parallels the common electrode; and a pixel electrode connected to a side surface of a drain electrode of the thin film transistor and formed from a third conductive layer within the pixel hole.

A method of fabricating a thin film transistor substrate of a horizontal electric field type liquid crystal display device includes the steps of: forming a gate line and a gate electrode connected to the gate line on a substrate from the first conductive layer; forming a common line parallel to the gate line and a common electrode extended from the common line from the first conductive layer; coating a gate insulating film over the substrate; forming a semiconductor pattern for a thin film transistor on the gate insulating film; forming a data line crossing the gate line and the common line, a source electrode connected to the data line and a drain electrode opposed to the source electrode from a second conductive layer on the semiconductor pattern; forming a dummy pattern connected to the drain electrode in parallel to the common electrode; coating a protective film over the substrate; patterning the protective film and etching the dummy pattern to expose the surface of the drain electrode to provide a pixel hole having an elongated shape in parallel with the common electrode; and forming a pixel electrode connected to a side surface of the drain electrode and formed from a third conductive layer within the pixel hole.

A method of fabricating a thin film transistor substrate of a horizontal electric field type liquid crystal display device includes: a first mask process of forming a gate line, a gate electrode connected to the gate line, a common line parallel to the gate line and a common electrode extended from the common line from a first conductive layer on a substrate; a second mask process of depositing a gate insulating film, forming semiconductor pattern and forming a data line crossing the gate line and the first common line, a source electrode and a lower data pad electrode connected to the data line, a drain electrode opposed to the source electrode, a dummy pattern connected to the drain electrode in parallel to the common electrode from the second layer on the semiconductor pattern; and a third mask process of coating a protective film, patterning the protective film and etching the dummy pattern to expose the side surface of the drain electrode to provide a pixel hole having an elongated shape in parallel with the common electrode, and forming a pixel electrode connected to a side surface of the drain electrode from a third conductive layer within the pixel hole.

BRIEF DESCRIPTION OF THE DRAWINGS

These and other objects of the invention will be apparent from the following detailed description of the embodiments of the present invention with reference to the accompanying drawings.

FIGS. 3A to 3D are cross-sectional views illustrating a method of fabricating the thin film transistor substrate shown in FIG. 2 step by step.

FIG. 7A and FIG. 7B are a plan view and a cross-sectional view for explaining a second mask process in a fabricating method of the thin film transistor substrate according to an embodiment of the present invention, respectively.

FIG. 9A and FIG. 9B are a plan view and a cross-sectional view for explaining a third mask process in a fabricating method of the thin film transistor substrate according to an embodiment of the present invention, respectively.

DETAILED DESCRIPTION OF THE PREFERRED EMBODIMENTS

Reference will now be made in detail to the preferred embodiments of the present invention, examples of which are illustrated in the accompanying drawings. Hereinafter, the preferred embodiments of the present invention will be described in detail with reference to FIGS. 4 to 10D.

Figure 1:
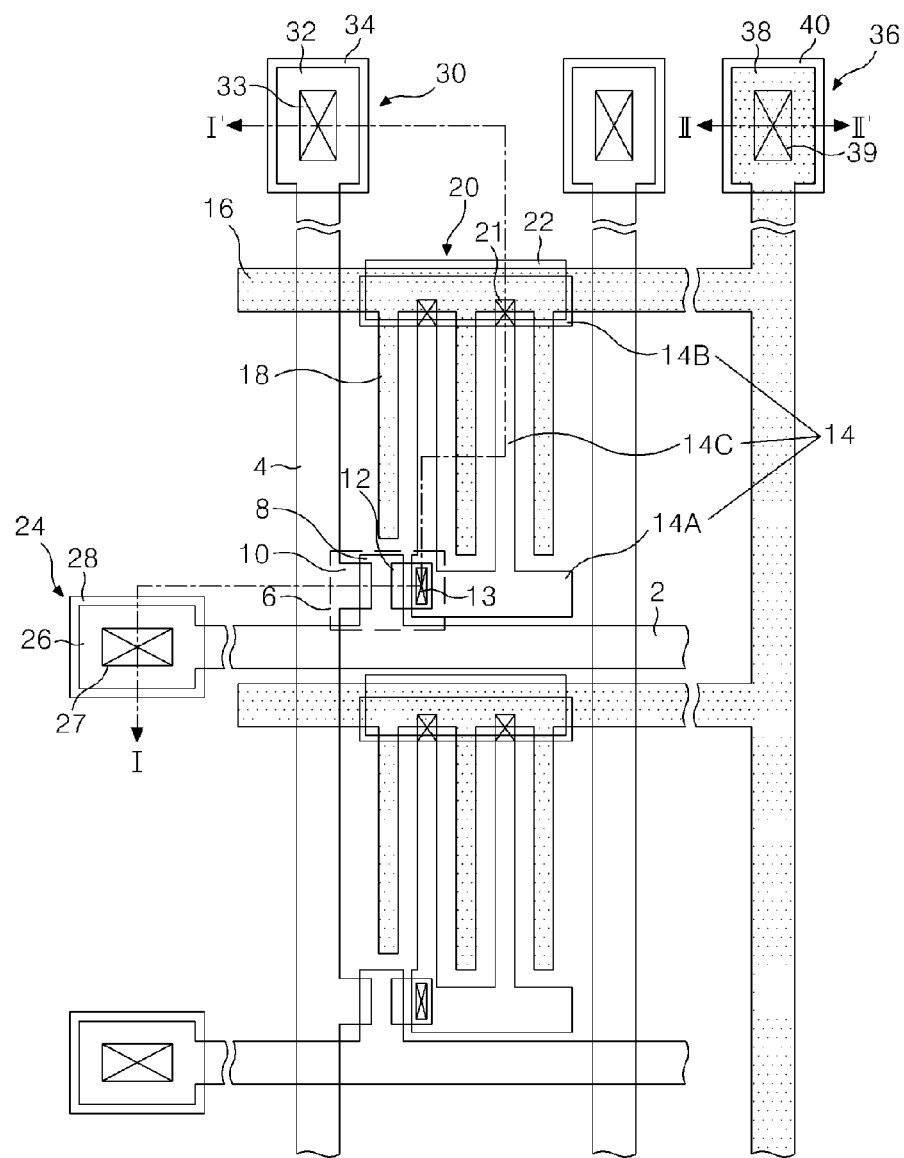
FIG. 1 is a plan view showing a structure of a conventional thin film transistor substrate of horizontal electric field type liquid crystal display device.
Figure 2:
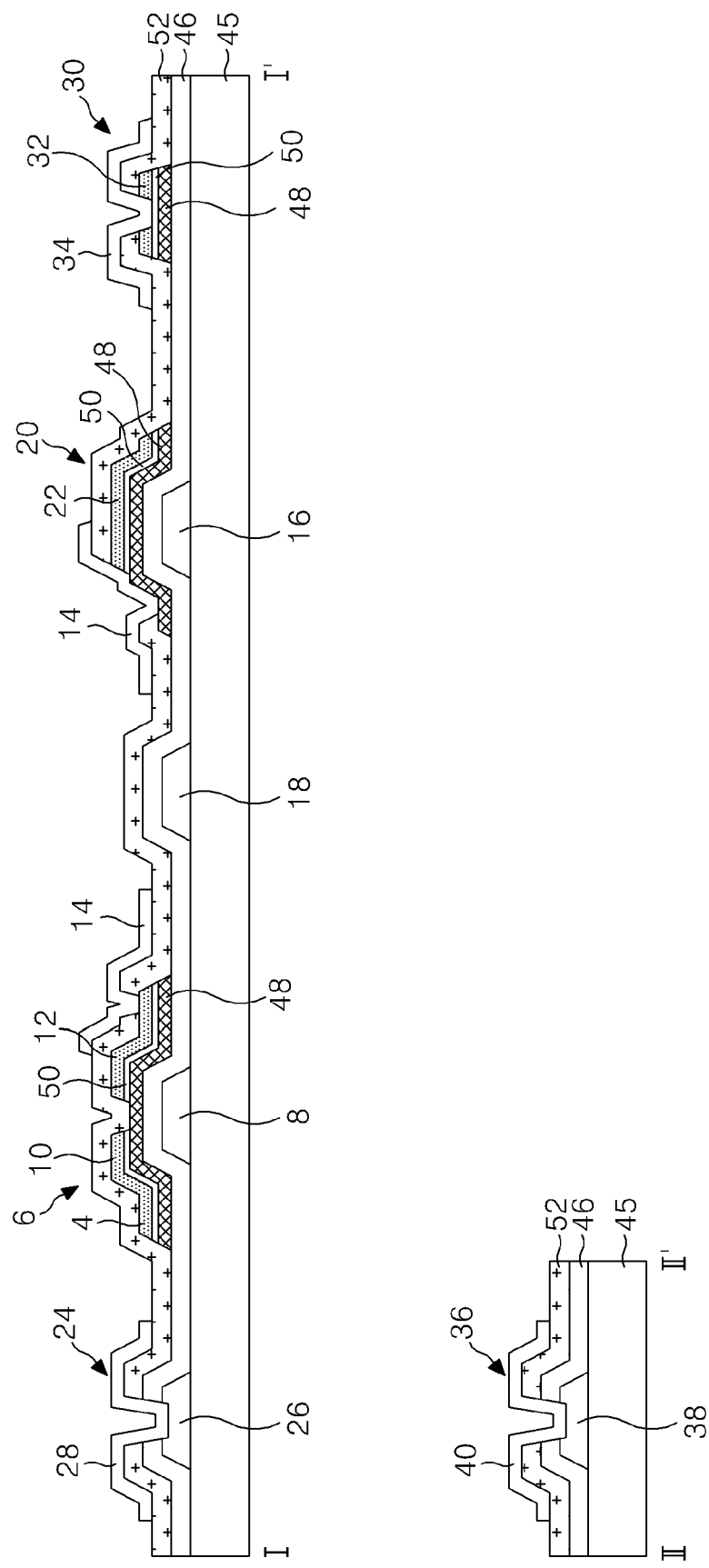
FIG. 2 is a cross-sectional view of the thin film transistor substrate taken along the lines I-I' and II-II in FIG. 1.
Figure 3A:
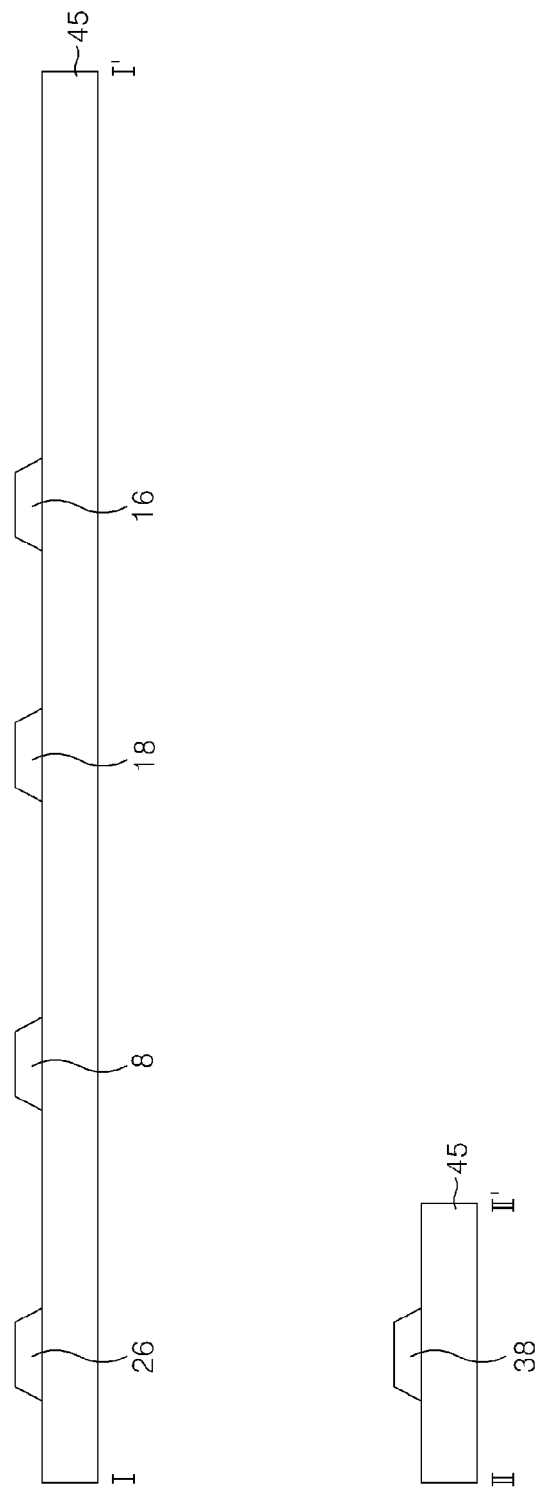
Figure 3B:
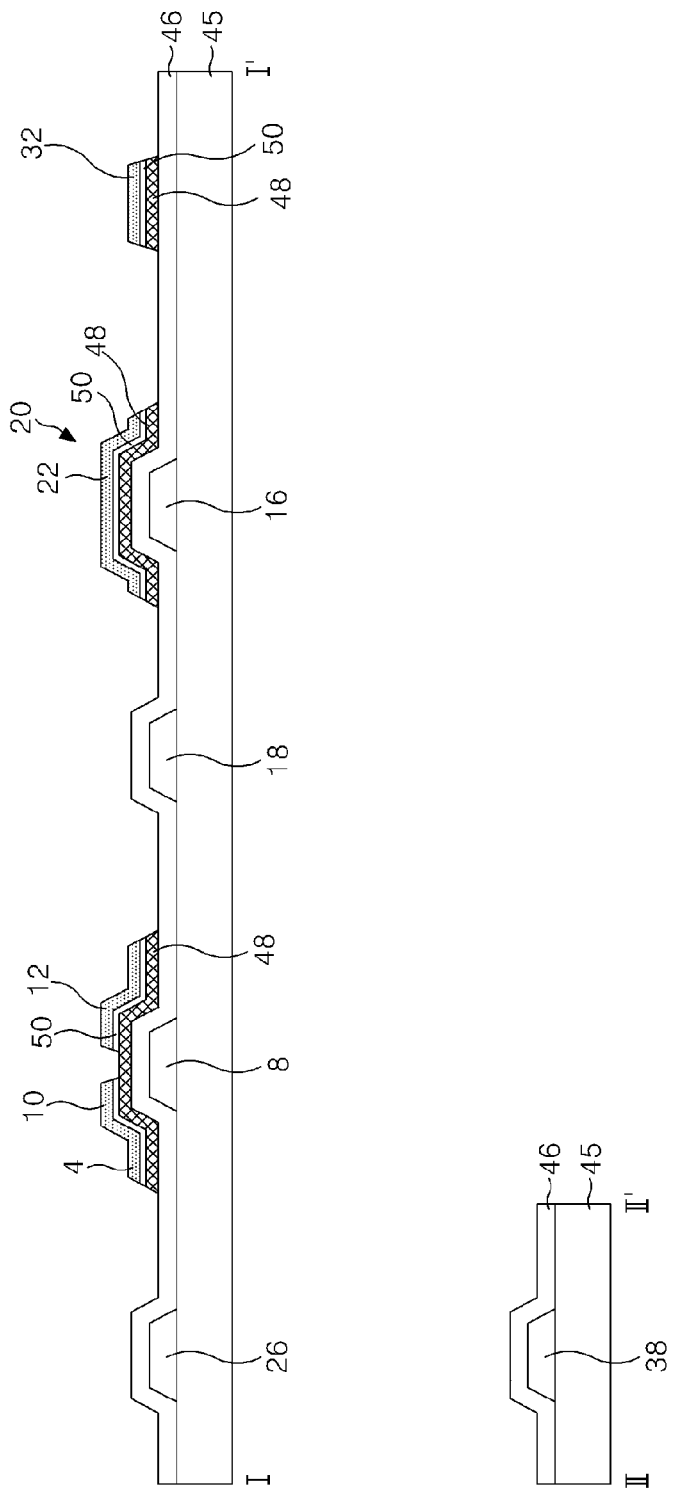
Figure 3D:
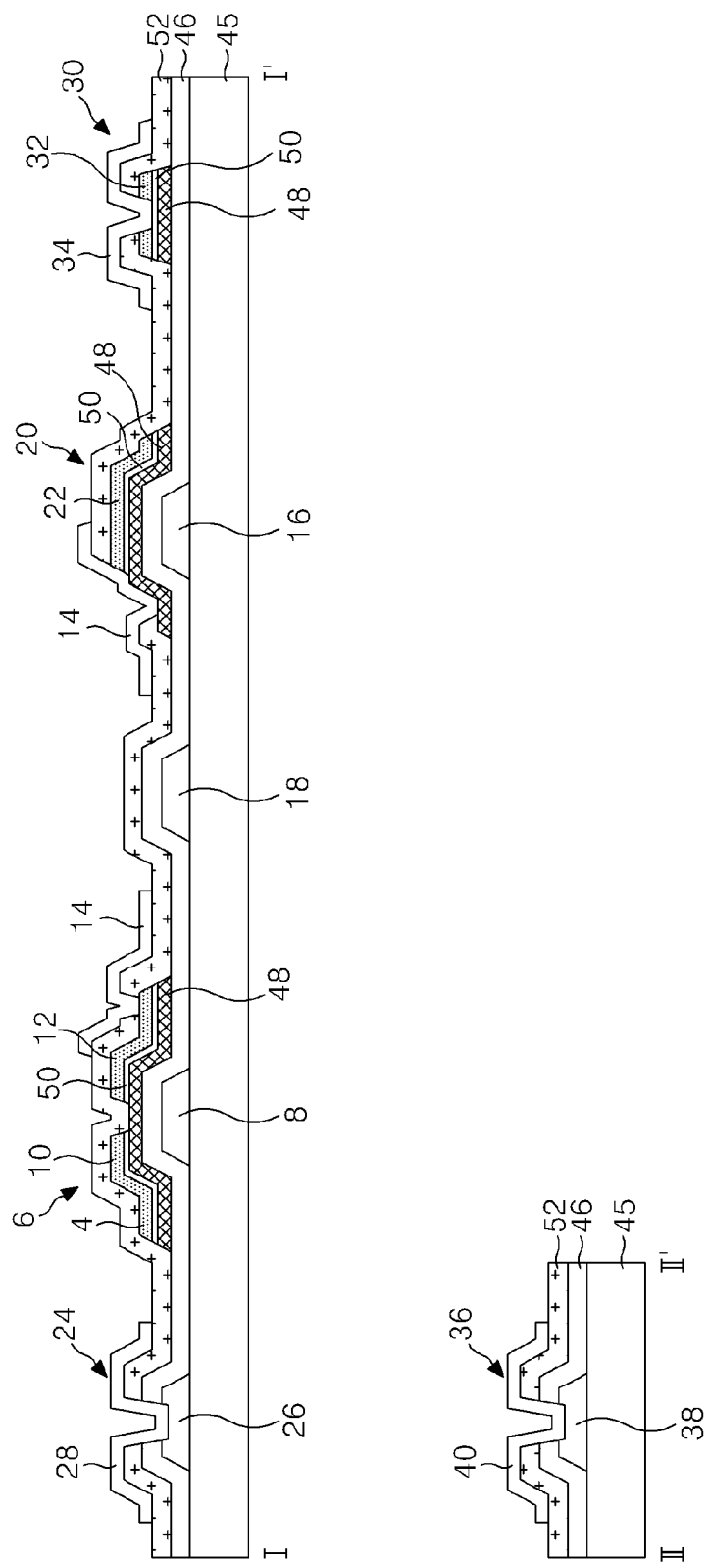
Figure 4:
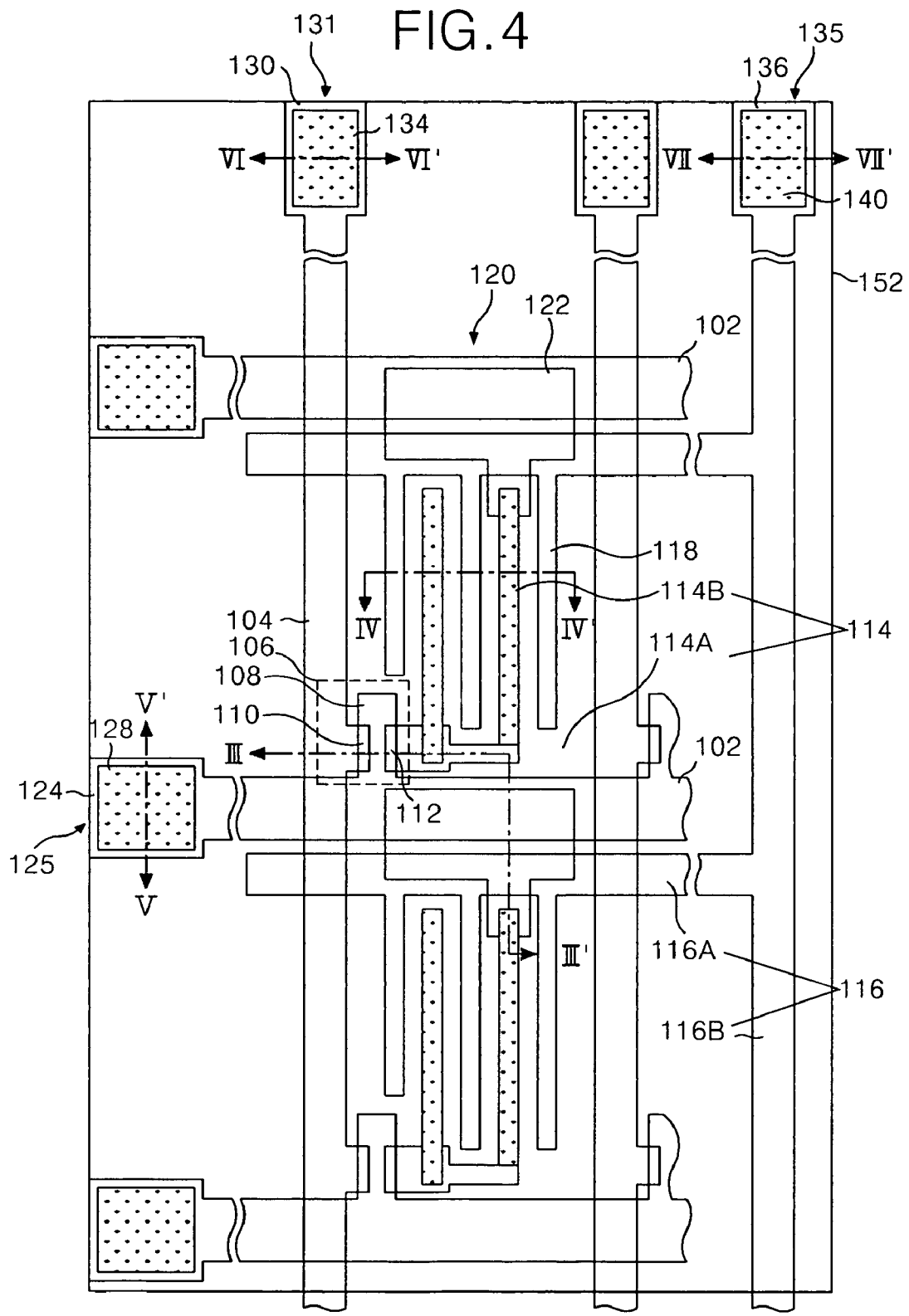
FIG. 4 is a plan view showing a structure of a thin film transistor substrate of a horizontal electric field type liquid crystal display device according to an embodiment of the present invention.
Figure 5:
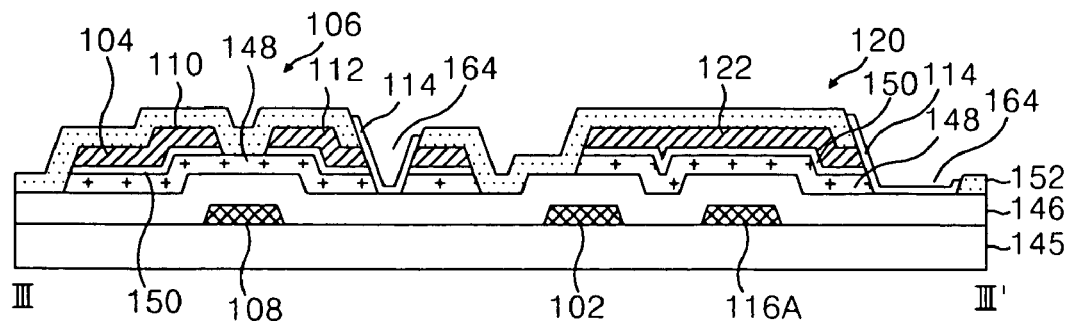
FIG. 5 is a cross-sectional view of the thin film transistor substrate taken along the lines III-III", IV-IV', V-V', VI-VI' and VII-VII' in FIG. 4.
Figure 5:
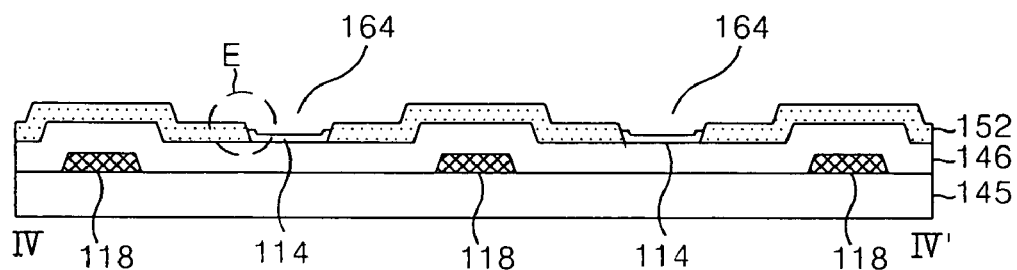
Figure 5:
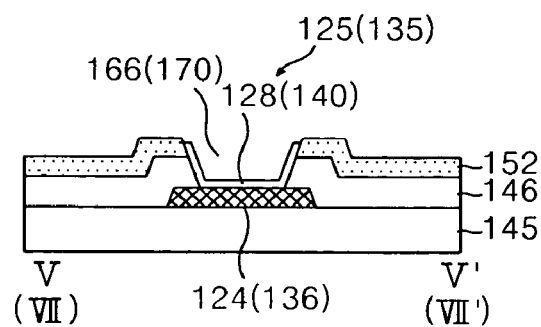
Figure 5:
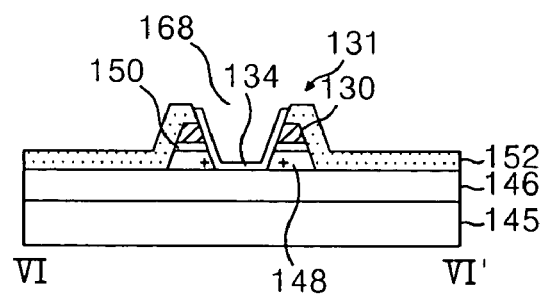

FIG. 4 is a plan view showing a structure of a thin film transistor substrate of a horizontal electric field type liquid crystal display device according to an embodiment of the present invention, and FIG. 5 is a cross-sectional view of the thin film transistor substrate taken along the lines III-III', IV-IV', V-V', VI-VI', and VII-VII' in FIG. 4. Referring to FIG. 4 and FIG. 5, the thin film transistor substrate includes a gate line 102 and a data line 104 provided on a lower substrate 145 in such a manner as to cross each other with a gate insulating film 146 therebetween. The gate line 102 and data line 104 define a pixel area. A thin film transistor 106 provided in each pixel area. A pixel electrode 114 and a common electrode 118 are provided in each pixel area for the purpose of forming a horizontal field to rotate a liquid crystal material. A common line 116 is connected to the common electrode 118. The thin film transistor substrate also includes a storage capacitors 120 having an upper storage electrode 122 overlapping the common line 116. Further, the thin film transistor substrate includes a gate pad 125 connected to the gate line 102, a data pad 131 connected to the data line 104, and a common pad 135 connected to the common line 116.

The gate line 102 is supplied with a gate signal and the data line 104 is supplied with a data signal. The gate line 102 and the data line 104 are separated by a gate insulating film 146 therebetween. The gate line 102 is formed from a first conductive layer (i.e., a gate metal layer). The data line 104 is formed from a second conductive layer (i.e., a source/drain metal layer).

The common line 116 and the common electrode 118 supply a reference voltage for driving the liquid crystal. The common line 116 includes an internal common line 116A provided in parallel to the gate line 102 in a display area. An external common line 116B commonly connected to the internal common line 116A in a non-display area. The common electrode 118 has a finger shape and extends from the internal common line 116A into the pixel area. The common line 116 and the common electrode 118 are formed from a first conductive layer along with the gate line 102.

The thin film transistor 106 allows the pixel signal of the data line 104 to be charged and maintained on the pixel electrode 114 in response to the gate signal of the gate line 102. To this end, the thin film transistor 106 includes a gate electrode 108 connected to the gate line 102, a source electrode 110 connected to the data line 104, a drain electrode 112 opposed to the source electrode 110, an active layer 148 overlapping the gate electrode 108 having the gate insulating film 146 therebetween to define a channel between the source electrode 110 and the drain electrode 112, and separated ohmic contact layers 150 provided on the active layer 148 to make ohmic contacts with the source electrode 110 and the drain electrode 112, respectively. The active layer 148 and the ohmic contact layer 150 overlaps the data line 104, a lower data pad electrode 130 and an upper storage electrode 122 that are all formed from a second conductive layer along with the source electrode 110 and the drain electrode 112.

The pixel electrode 114 along with the common electrode 118 forms a horizontal electric field in the pixel area. The pixel electrode 114 is connected to the drain electrode 112 of the thin film transistor 106. More specifically, the pixel electrode 114 is formed from a third conductive layer (i.e., a transparent conductive layer or a Ti layer) deposited within a pixel hole 164 passing through a protective layer 152 in the pixel area. The pixel hole 164 in the protective film 152 has an elongated shape that is parallel to the common electrodes 118 and passes through a portion of the drain electrode 112 extending in parallel to the gate line 102 to expose the side surface of the drain electrode 112. Thus, the pixel electrode 114 makes an interface with the protective film 152 within the pixel hole 164 and is connected, on a side surface basis, to the drain electrode 112.

A horizontal electric field can be formed between the pixel electrode 114 to which a pixel signal is supplied via the thin film transistor 106 and the common electrode 118 to which a reference voltage is supplied via the common line 116. As a result, liquid crystal molecules arranged in the horizontal direction between the thin film transistor substrate and the color filter substrate by such a horizontal electric field are rotated due to the dielectric anisotropy. Transmittance of light transmitting the pixel area is differentiated depending upon rotation extent of the liquid crystal molecules, thereby implementing a gray level scale.

The storage capacitor consists of a portion of the first common line 116A, which is a first lower storage electrode, and the upper storage electrode 122 that overlaps a portion of the first common line 116A. A gate insulating film 146, the active layer 148 and the ohmic contact layer 150 is between the first common line 116A and the upper storage electrode 122. The upper storage electrode 122 is connected between the finger parts 114B of the pixel electrode 114 crossing the first common line 116A and is formed from the second conductive layer along with the pixel electrode 114. Such a storage capacitor allows a pixel signal charged in the pixel electrode 114 to be stably maintained until the next pixel signal is charged.

The gate line 102 is connected, via the gate pad 125, to a gate driver (not shown). The gate pad 125 consists of a lower gate pad electrode 124 extended from the gate line 102, and an upper gate pad electrode 128 connected, via a first contact hole 166 through the gate insulating film 146 and the protective film 152, to the lower gate pad electrode 124.

The common line 116 receives a reference voltage from an external reference voltage source (not shown) through the common pad 135. The common pad 135 includes a lower common pad electrode 136 extending from the common line 116, and an upper common pad electrode 140 connected, via a second contact hole 170 through the gate insulating film 146 and the protective film 152, to the lower common pad electrode 136.

The data line 104 is connected, via the data pad 131, to the data driver (not shown). The data pad 131 includes a lower data pad electrode 130 extending from the data line 104, and an upper data pad electrode 134 connected, via a third contact hole 168 through the protective film 152, to the lower data pad electrode 130. In this case, the third contact hole 168 is formed in such a manner to pass through the lower data pad electrode 130, the ohmic contact layer 150 and the active layer 148 under the protective film 152, thereby connecting the upper data pad electrode 134 to the lower data pad electrode 130 at a side surface.

In such a thin film transistor, the upper gate pad electrode 128, the upper data pad electrode 134 and the upper common pad electrode 140 are formed from a third conductive layer along with the pixel electrode 114. The third conductive layer is patterned by a lift-off process of removing a photo-resist pattern used upon patterning of the protective film 152 and the gate insulating film 146. Thus, the patterned third conductive layer makes an interface with the protective film 152. The thin film transistor substrate according to the embodiment of the present invention eliminates the mask process of patterning the third conductive layer by using such a lift-off process.

To enhance a lift-off ability of the photo-resist pattern, the pixel hole 164 and the first to third contact holes 166, 170 and 168 are used as a penetration path for a stripper. In addition, the pixel electrode 114 is provided within the pixel hole 164 defined in the protective film 152 on the gate insulating film 146 such that an edge E thereof has a low step coverage to prevent light leakage. When the edge E of the pixel electrode 114 has a high step coverage (for example, when it is formed within the pixel hole passing through the protective film and the gate insulating film), the high step coverage brings about a mis-alignment, which creates a high probability of generating a light leakage. As a result, according to an embodiment of the present invention, the edge E of the pixel electrode 114 has a low step coverage so as to prevent light-leakage. A method of fabricating the thin film transistor substrate according to an embodiment of the present invention having such advantages will be described in detail below.

Figure 6A:
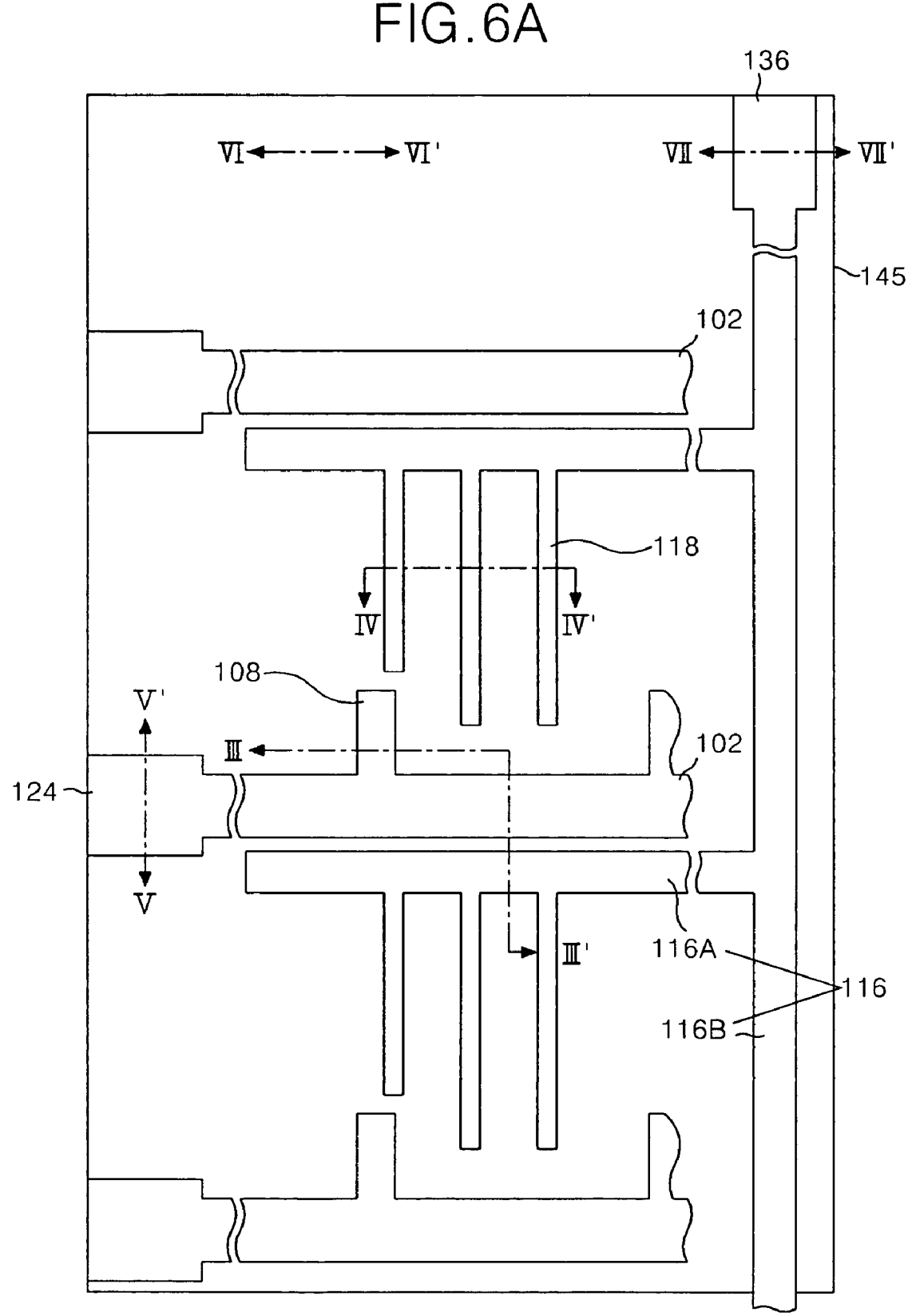
FIG. 6A and FIG. 6B are a plan view and a cross-sectional view for explaining a first mask process in a fabricating method of the thin film transistor substrate according to an embodiment of the present invention, respectively.
Figure 6B:
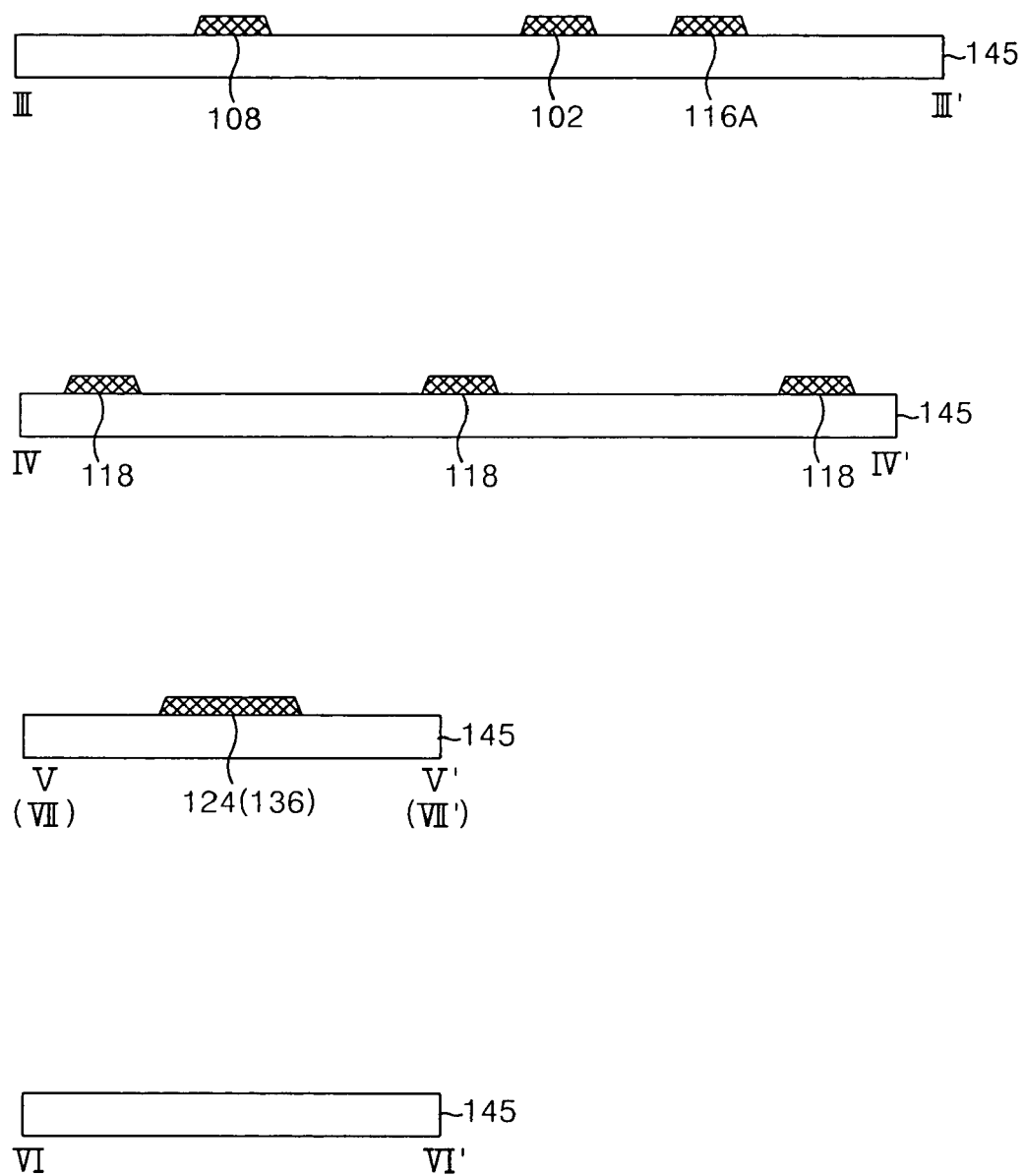

FIG. 6A and FIG. 6B are a plan view and a cross-sectional view for explaining a first mask process in a fabricating method of the thin film transistor substrate of horizontal electric field type according to an embodiment of the present invention, respectively. As shown in FIG. 6A and FIG. 6B, a first conductive pattern group including the gate line 102, the gate electrode 108 and the lower gate pad electrode 124, the common line 116, the common electrode 118 and the lower common pad electrode 136 is provided on the lower substrate 145 by a first mask process. More specifically, a first conductive layer is formed on the upper substrate 145 by a deposition technique, such as sputtering. Then, the first conductive layer is patterned by photolithography and etching process using a first mask to form the first conductive pattern group including the gate line 102, the gate electrode 108, the lower gate pad electrode 124, the common line 116, common electrode 118 and the lower common pad electrode 136. The first conductive layer can be made from Cr, MoW, Cr/Al, Cu, Al(Nd), Mo/Al, Mo/Al(Nd) or Cr/Al(Nd), etc.

Figure 7B:
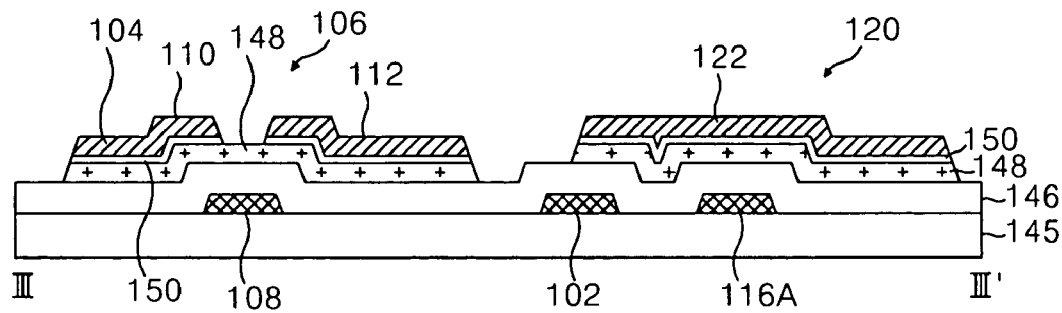
Figure 7B:
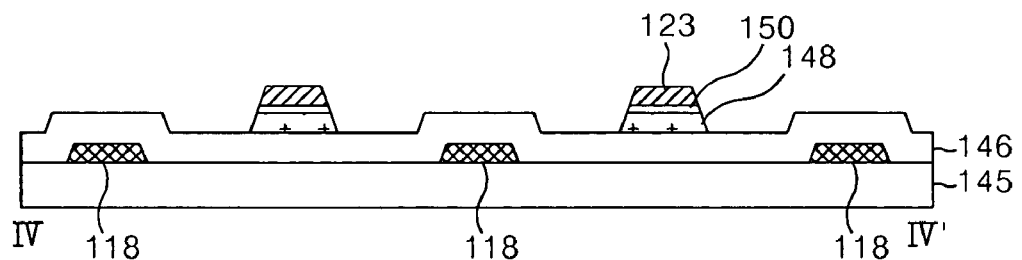
Figure 7B:
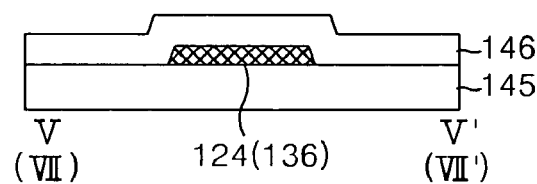
Figure 7B:
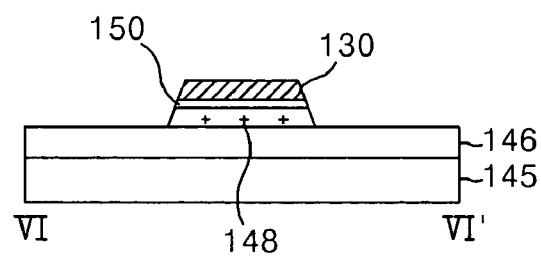

FIG. 7A and FIG. 7B are a plan view and a cross-sectional view for explaining a second mask process in a fabricating method of the thin film transistor substrate of a horizontal electric field type liquid crystal display device according to an embodiment of the present invention, respectively, and FIG. 8A to FIG. 8D are cross-sectional views for specifically explaining the second mask process.

First, the gate insulating film 146 is formed over the lower substrate 145 having the first conductive pattern group thereon by a deposition technique, such as plasma enhanced chemical vapor deposition (PECVD) or sputtering. The gate insulating film 146 is formed from an inorganic insulating material, such as silicon nitride ($SiN_x$) or silicon oxide ($SiO_x$).

Figure 8A:
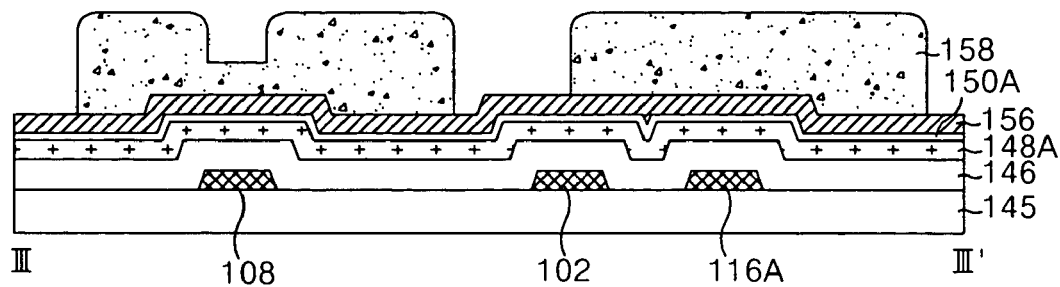
FIG. 8A to FIG. 8D are cross-sectional views for specifically explaining the second mask process in a fabricating method of the thin film transistor substrate according to an embodiment of the present invention.
Figure 8A:
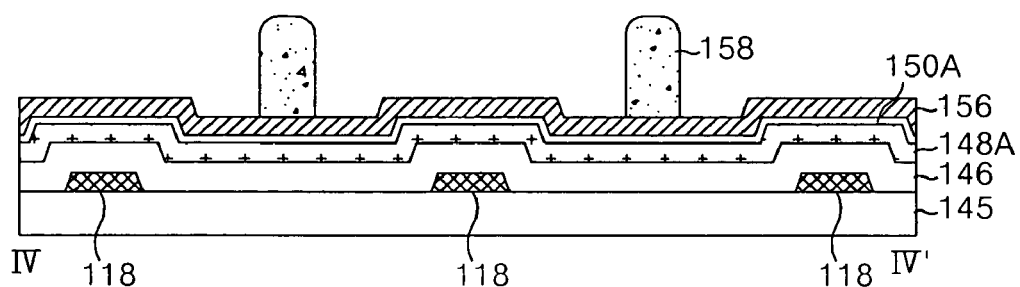
Figure 8A:
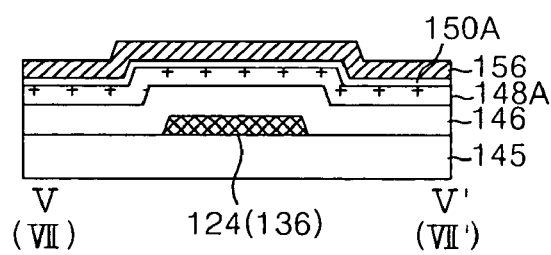
Figure 8A:
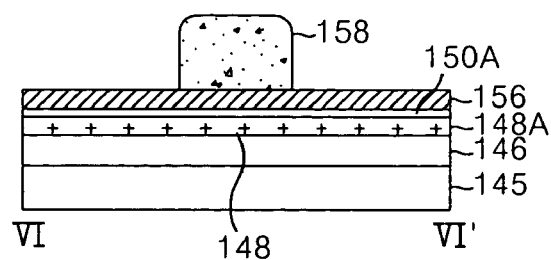

Next, as shown in FIG. 7A and FIG. 7B, a semiconductor pattern including the active layer 148 and the ohmic contact layer 150 are disposed on the gate insulating film 146; and a second conductive pattern group, including the data line 104, the source electrode 110, the drain electrode 112, the lower data pad electrode 130, the upper storage electrode 122 and a dummy pattern 123 in the pixel area, is provided by the second mask process. More specifically, as shown in FIG. 8A, an amorphous silicon layer 148A, an $n^+$ amorphous silicon layer 150A and the second conductive layer 156 are sequentially formed on the gate insulating film 146 by deposition techniques, such as plasma enhanced chemical vapor deposition (PECVD) or sputtering. The second conductive layer 156 can be made from Cr, MoW, Cr/Al, Cu, Al(Nd), Mo/Al, Mo/Al(Nd) or Cr/Al(Nd).

Subsequently, a photo-resist film is coated over the entire second conductive layer 156 and then a photo-resist pattern 158 having a step coverage, as shown in FIG. 8A, is formed by photolithography using a second mask that is a partial-exposure mask. In this case, a partial-exposure mask having a diffractive exposing part (or a semi-transmitting part) at a portion of the mask where the channel of the thin film transistor is to be formed is used as the second mask. Thus, the diffractive exposing part (or the semi-transmitting part) of the second mask has a height lower than the photo-resist pattern 158 corresponding to a transmitting part (or a shielding part) of the second mask. In other words, the photo-resist pattern 158 has a lower height at the channel portion than the photo-resist pattern 158 at other source/drain metal pattern portions.

Figure 8B:
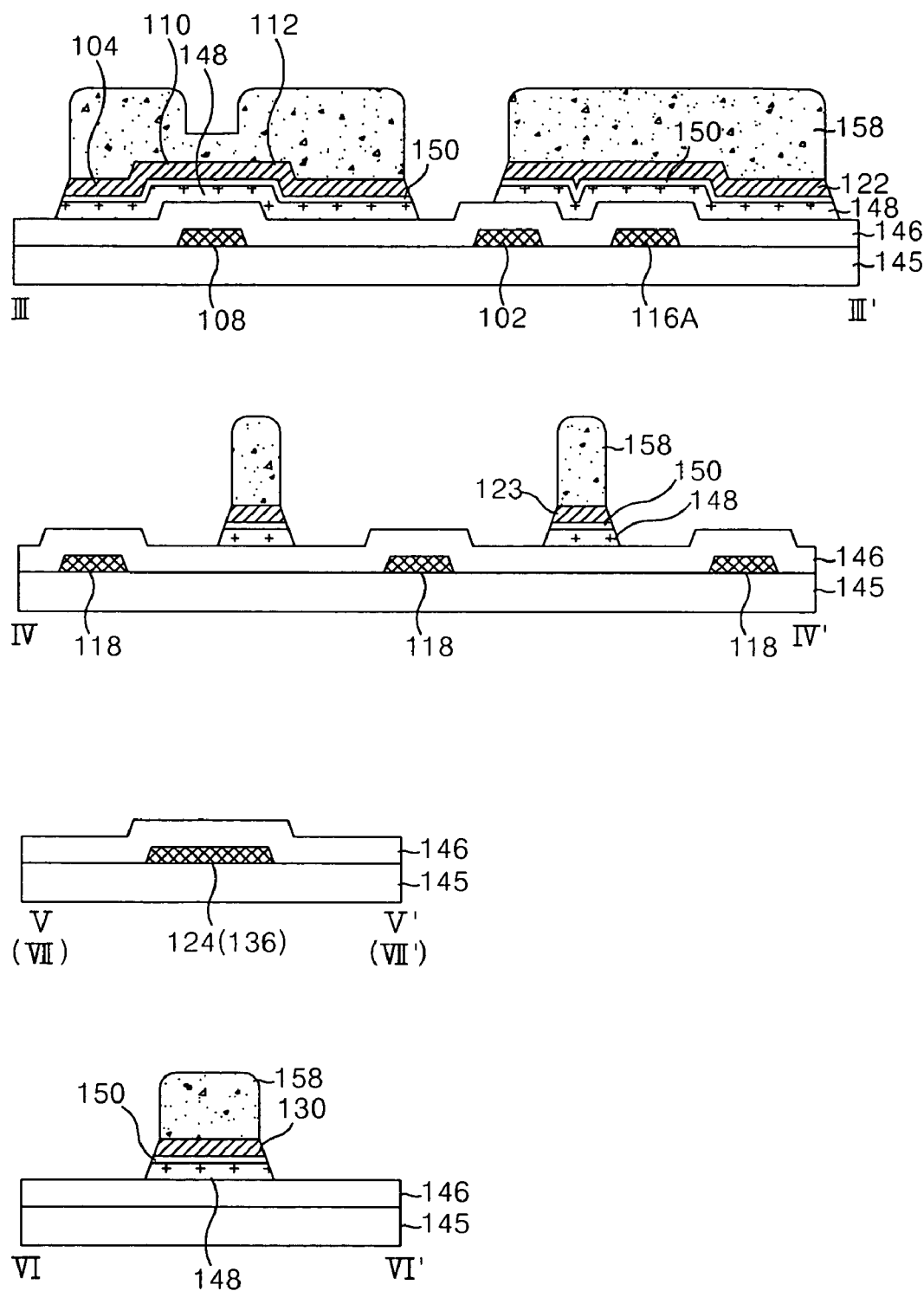

Subsequently, the second conductive layer 156 is patterned by a wet etching process using the photo-resist pattern 158, to thereby provide the second conductive metal pattern group including the data line 104, the source electrode 110 of the thin film transistor portion, the drain electrode 112 being integral to the source electrode 110, the dummy pattern 123 being integral to the drain electrode 112 to be extended into the pixel area, the lower data pad electrode 130 and the upper storage electrode 122 as shown in FIG. 8B. Herein, the upper storage electrode 122 overlaps with a portion of the gate line 102 and the internal common line 116A. The dummy pattern 123 is provided at the pixel area, that is, at a portion where the pixel hole is to be formed, and aims at preventing the pixel hole from passing through the gate insulating film 146 for the purpose of reducing step coverage of the pixel electrode. Further, the $n^+$ amorphous silicon layer 150A and the amorphous silicon layer 148A are patterned at the same time by a dry etching process using the same photo-resist pattern 158 to thereby provide a structure in which the ohmic contact layer 150 and the active layer 148 are formed along the second conductive pattern group, as shown in FIG. 8B.

Figure 8C:
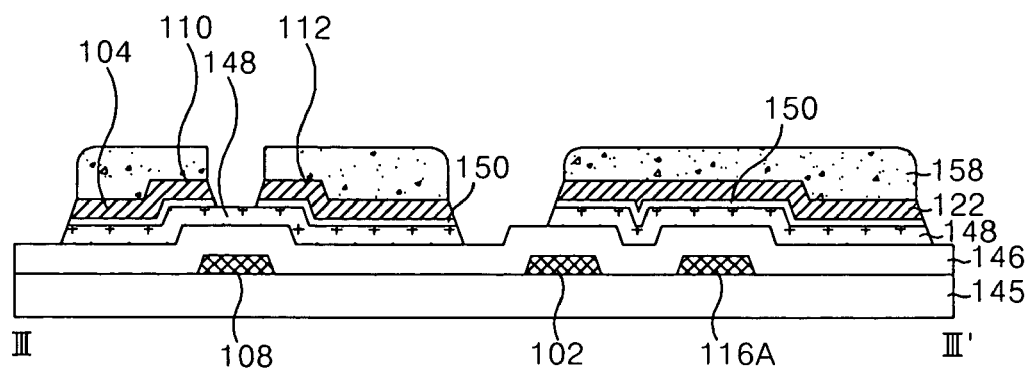
Figure 8C:
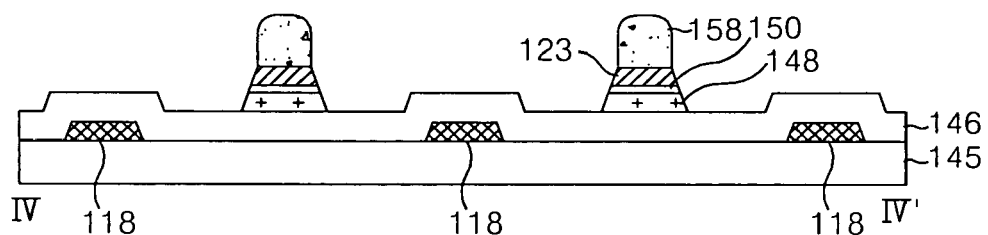
Figure 8C:
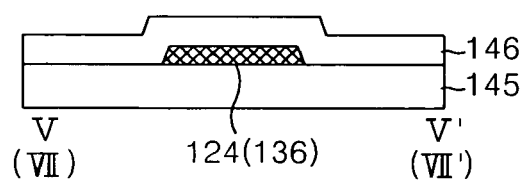
Figure 8C:
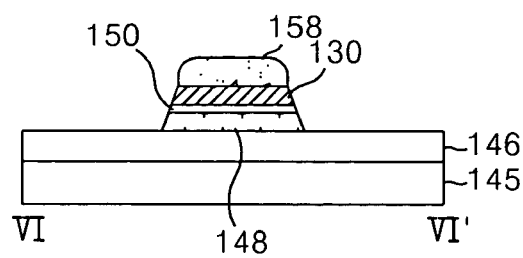
Figure 8D:
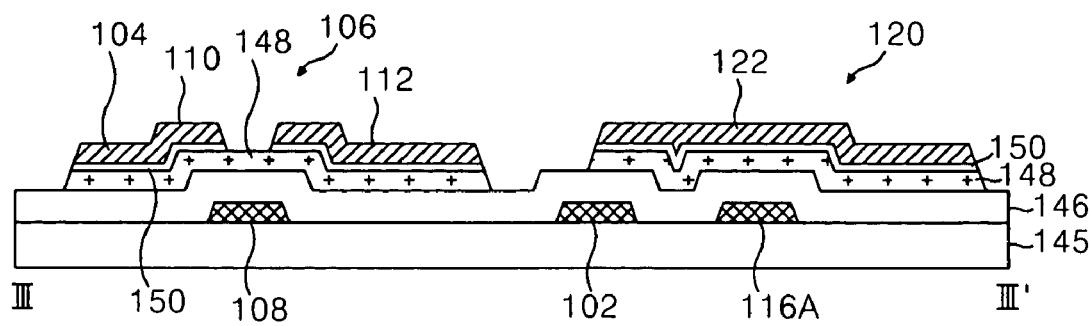
Figure 8D:
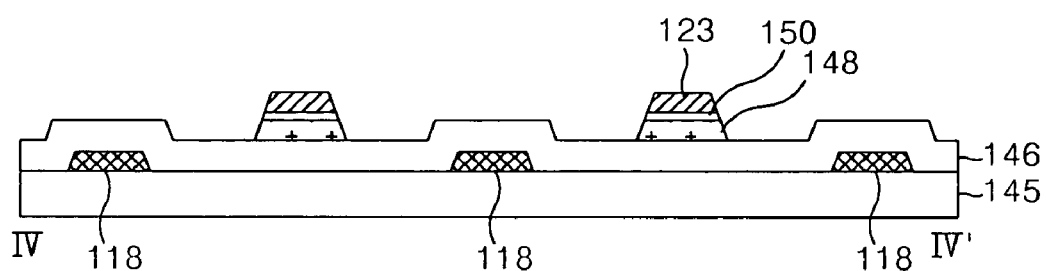
Figure 8D:
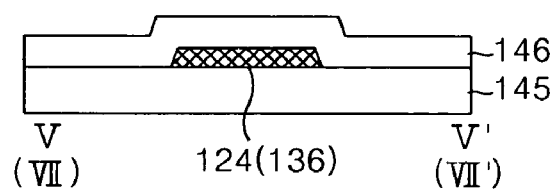
Figure 8D:
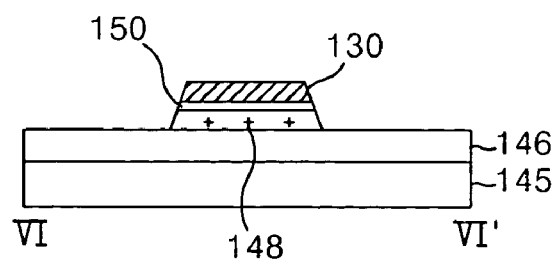

The photo-resist pattern 158 at the channel portion having a relatively low height is removed as shown in FIG. 8C by the ashing process using oxygen ($O_2$) plasma while the photo-resist pattern 158 at other second conductive pattern group portion has a lower height. Then, the second conductive layer and the ohmic contact layer 150 are etched from a portion at which the channel is formed, as shown in FIG. 8C by the dry etching process using the remaining photo-resist pattern 158, thereby disconnecting the source electrode 110 from the drain electrode 112 and exposing the active layer 148. Thus, a channel made from the active layer 148 is defined between the source electrode 110 and the drain electrode 114. Further, the photo-last of the resist pattern 158 left on the second conductive pattern group portion is entirely removed as shown in FIG. 8D by the stripping process.

Figure 9B:
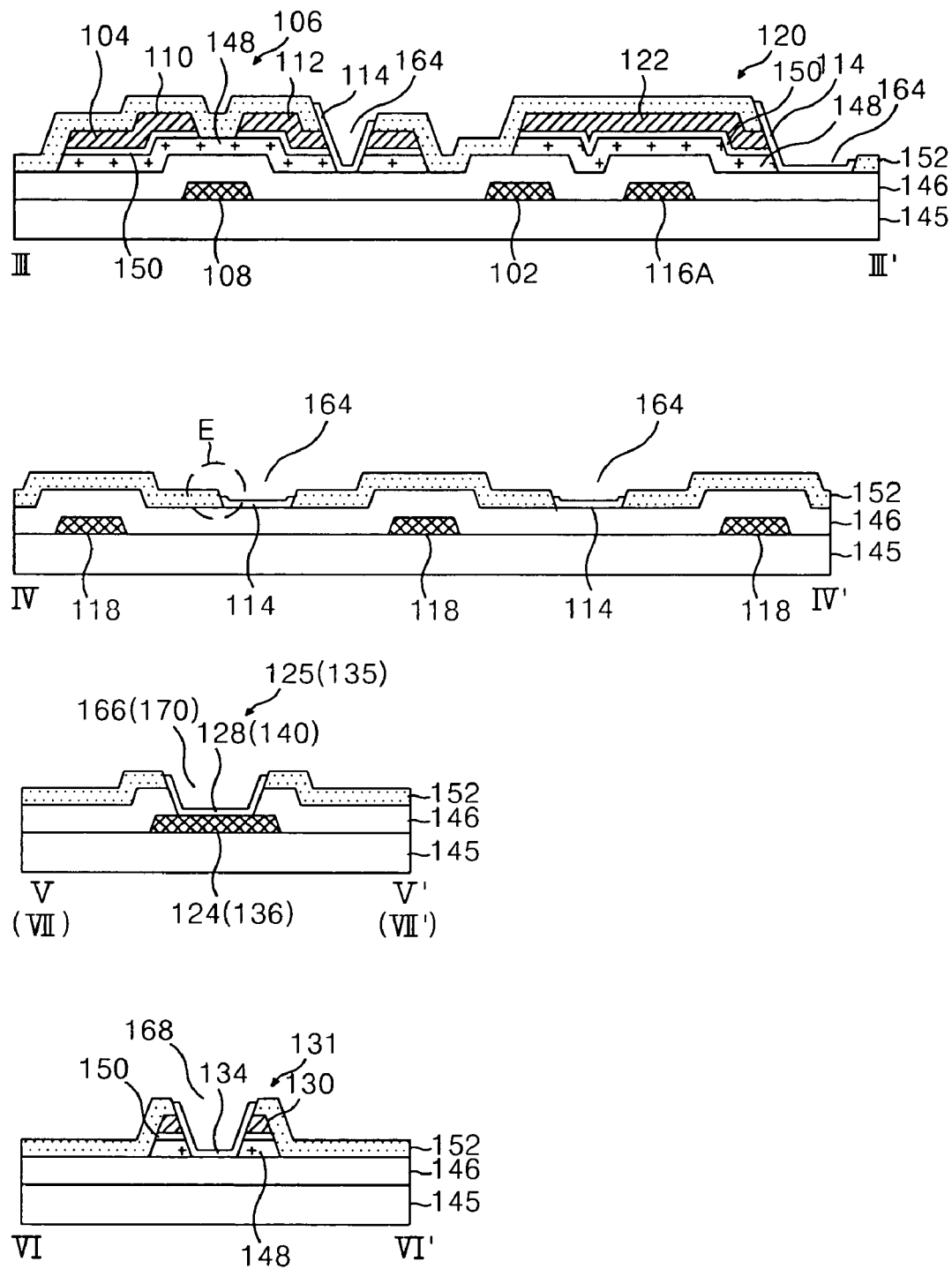

FIG. 9A and FIG. 9B are a plan view and a cross-sectional view for explaining a third mask process in a fabricating method of the thin film transistor substrate of horizontal electric field type liquid crystal display device according to an embodiment of the present invention, respectively. FIG. 10A to FIG. 10D are cross-sectional views for specifically explaining the second mask process.

Figure 10A:
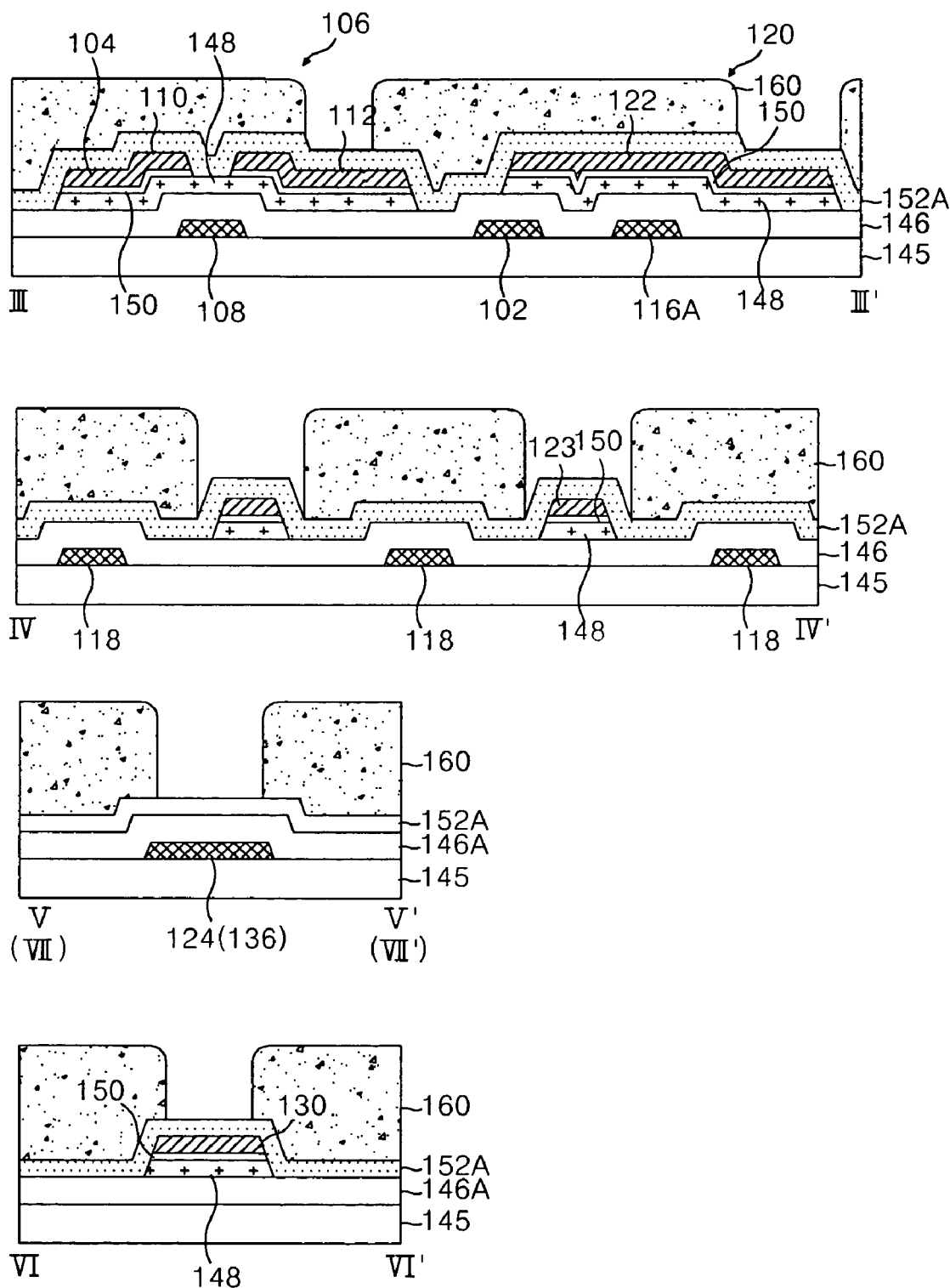
FIG. 10A to FIG. 10D are cross-sectional views for specifically explaining the third mask process in a fabricating method of the thin film transistor substrate according to the embodiment of the present invention.

As shown in FIG. 9A and FIG. 9B, by the third mask process, the protective film 152 and the gate insulating film 146 are patterned and a third conductive pattern group, including the pixel electrode 114, the upper gate pad electrode 128, the upper data pad electrode 134 and the upper common pad electrode 140, is formed. Such a third conductive pattern group makes an interface with the patterned protective film 152 without any overlapped portions. More specifically, the protective film 152 is formed over the entire the second conductive pattern group on the gate insulating film 146, as shown in FIG. 10A. The protective film 152 is formed from an inorganic insulating material or an organic insulating material similar to the gate insulating film 146. Further, a photo-resist pattern 160 is formed at a portion where the protective film 152 must exist, as shown in FIG. 10A, by photolithography using a third mask.

Figure 10B:
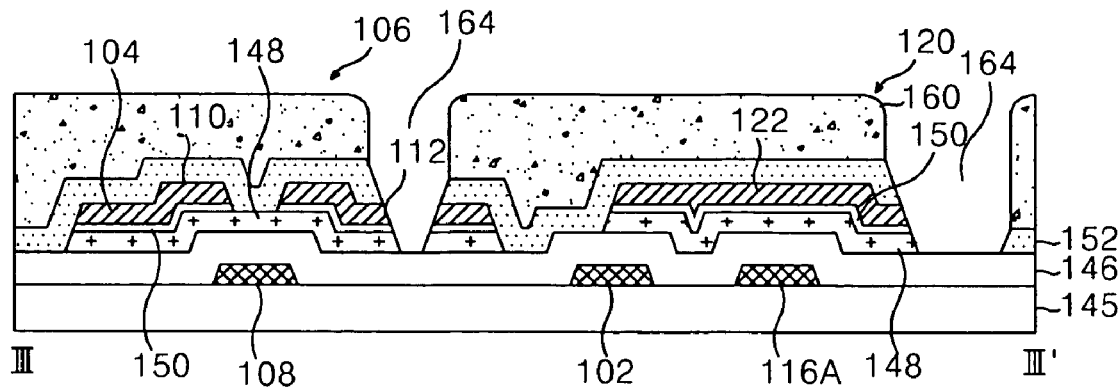
Figure 10B:
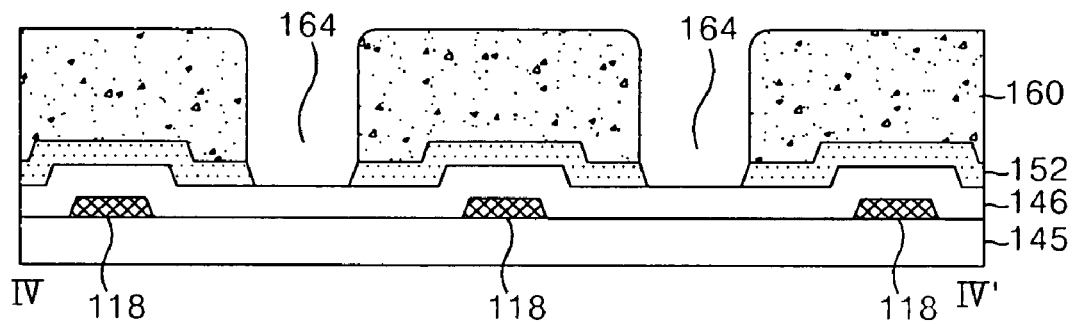
Figure 10B:
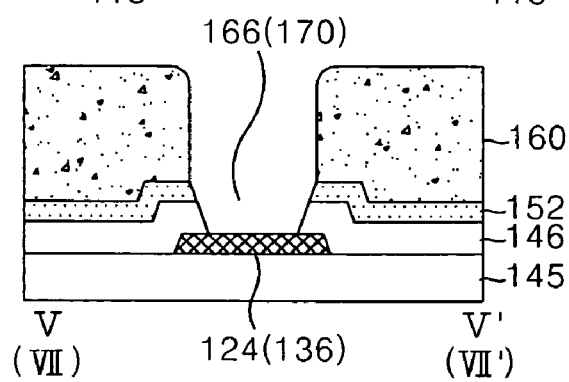
Figure 10B:
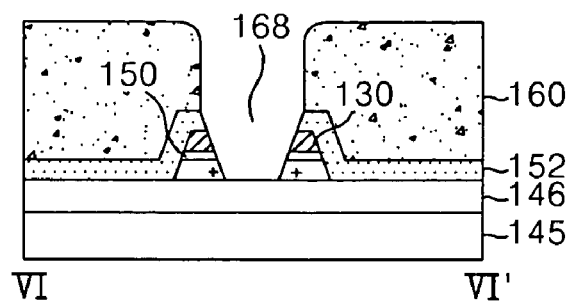

The protective film 152 and the gate insulating film 146 are patterned by the dry etching process using the photo-resist pattern 160. Thus, as shown in FIG. 10B, the pixel hole 164 and the third contact hole 168 passing through the protective film 152 and the second conductive pattern and the semiconductor pattern under it are provided and the first and second contact holes 166 and 170 passing through the protective film 152 and the gate insulating film 146 are also provided. More specifically, the pixel hole 164 is formed by etching the dummy pattern 123, along with the protective film 152 on the dummy pattern 123, at a portion where the dummy pattern 123 is to be formed, that is, at a portion where the pixel electrode is to be formed. In other words, the pixel hole 164 is formed in such a manner to pass through only the protective film 152 by the dummy pattern 123 and the ohmic contact layer 150 and the active layer 148 under the dummy pattern 123, thereby leaving the gate insulating film 146 under it. In this case, the pixel hole 164 allows a portion of the drain electrode 122 and the upper storage electrode 122 to be passed through until the ohmic contact layer 150 and the active layer 148, thereby exposing the side surfaces thereof. Further, the first and second contact holes 166 and 170 pass through the protective film 152 and the gate insulating film 146, to thereby expose the lower gate pad electrode 124 and the lower common pad electrode 136, respectively. The third contact hole 168 passes through the protective film 152, the lower data pad electrode 130, the ohmic contact layer 150 and the active layer 148 to thereby expose the side surfaces thereof.

Figure 10C:
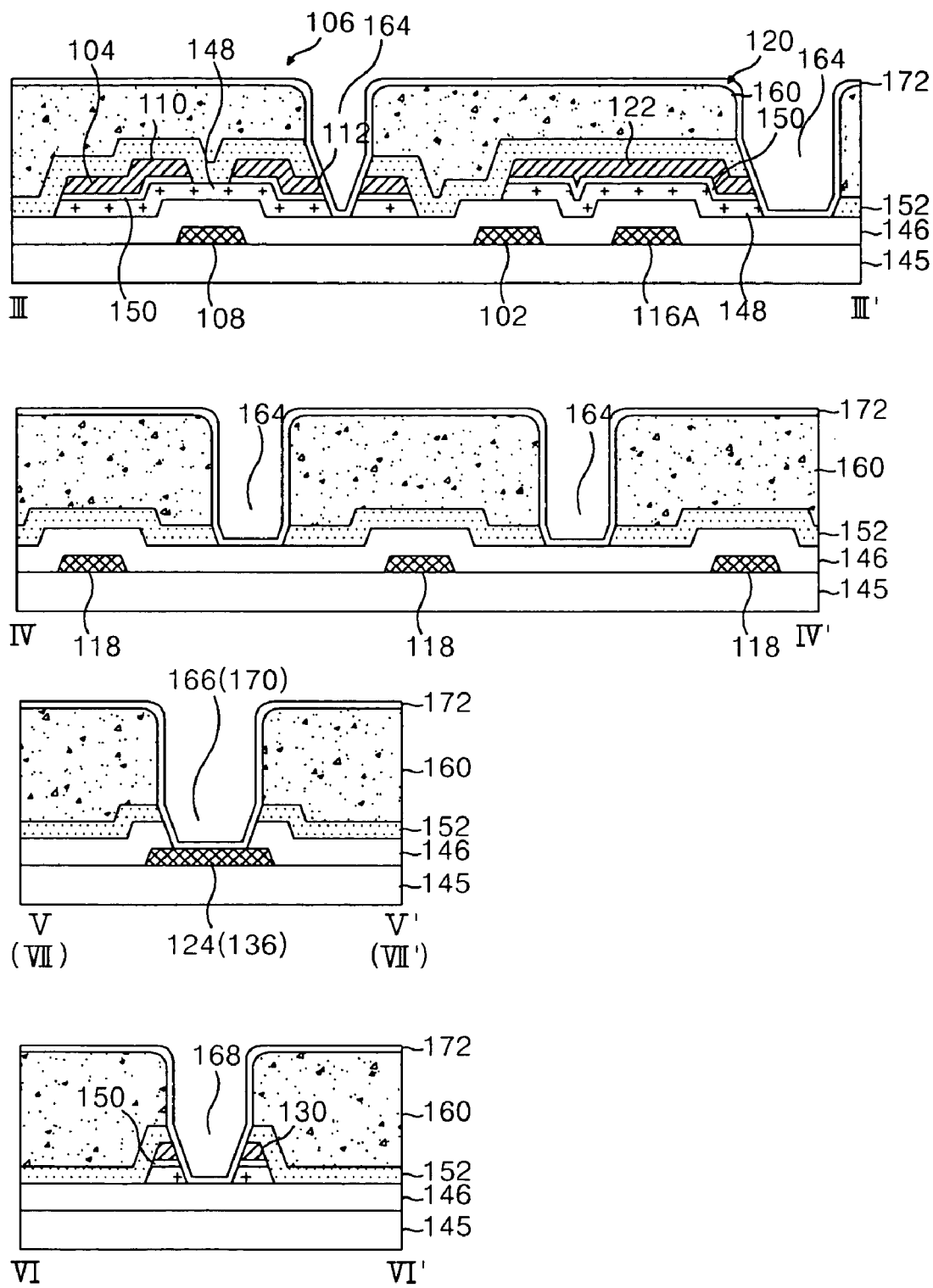

Subsequently, a third conductive layer 172 is formed over the entire photo-resist pattern 160 exists, as shown in FIG. 10C by a deposition technique such as sputtering and the like. The third conductive layer 172 is formed from a transparent conductive film, such as indium-tin-oxide (ITO), tin-oxide (TO) or indium-zinc-oxide (IZO). Alternatively, the third conductive film 172 can be made from a metal having a high corrosion-resisting and a high mechanical strength, such as titanium (Ti) or tungsten (W).

Figure 10D:
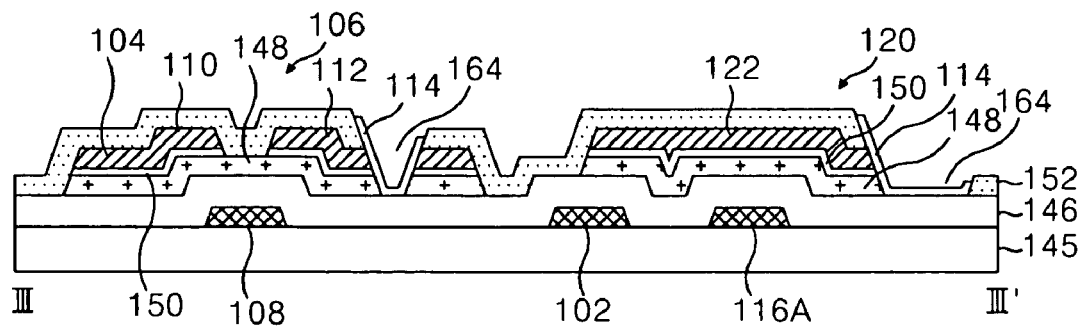
Figure 10D:
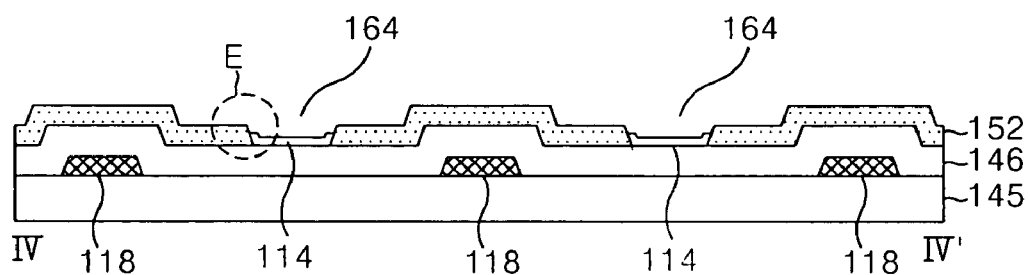
Figure 10D:
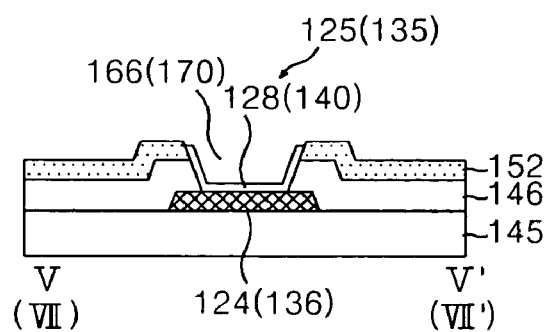
Figure 10D:
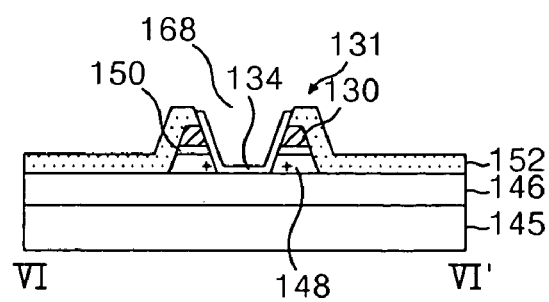

The photo-resist pattern 160 with the third conductive layer 172 thereon is simultaneously removed by the lift-off process, to thereby pattern the third conductive layer 172. Thus, the pixel hole 164 and the first to third contact holes 166, 170 and 168 are provided with the pixel electrode 114, the upper gate pad electrode 128, the upper common pad electrode 140 and the upper data pad electrode 134, respectively, as shown in FIG. 10D.

In this case, the pixel hole 164 and the first to third contact holes 162, 166 and 170 are formed where the photo-resist pattern 160 does not exist such that they can be used as stripper penetration paths. In particular, the pixel hole 164 has an elongated shape, which parallels the common electrode. These paths permit a greater amount of stripper A to be infiltrate into the interface part between the photo-resist pattern 160 and the protective film 152. As a result, the photo-resist pattern 160 covered with the third conductive layer 172 can be easily separated from the protective film 152 by the stripper A. This is caused by a fact that the edge of the photo-resist pattern 160 has a more protruded shape (not shown) than the edge of the protective film 152 at a portion where the pixel hole 164 and the first to third contact holes 162, 166 and 170 are provided in the protective film 152 due to an over-etching of the protective film 152. Further, this is also because the third conductive layer 172 is deposited with a linearity between the edge of the photo-resist pattern 160 and the edge of the protective film such that an opening in the third conductive layer 172 occurs or a relatively thin third conductive layer 172 deposited at the protruded edge of the photo-resist pattern 160, to thereby allow easy infiltratation of the stripper.

As mentioned above, an unnecessary portion of the third conductive layer 172, along with the photo-resist pattern 160, is removed by the lift-off process, so that the third conductive pattern group makes an interface with the protective film 152. More specifically, the pixel electrode 114 is provided within the pixel hole 164 for connection to a side surface of the exposed drain electrode 112 and the exposed upper storage electrode 122. The upper gate pad electrode 128 and the upper common pad electrode 140 are provided within the corresponding contact holes 166 and 170 for connection to the lower gate pad electrode 124 and the lower common pad electrode 136, respectively. The upper data pad electrode 134 is provided within the third contact hole 168 for connection to the lower data pad electrode 130 on a side surface basis.

Particularly, the pixel electrode 114 is provided within the pixel hole 164 passing through only the protective film 152 on the gate insulating film 146, so that the edge B thereof can have a low step coverage. Thus, it becomes possible to prevent a light-leakage that may be caused by a high step coverage of the pixel the pixel electrode 114. Further, if titanium (Ti) is used as the third conductive layer 172, then it becomes possible to prevent a light leakage through the pixel electrode 114 as well as to prevent an electro-chemical corrosion and a tearing, etc. of the pad portion, thereby assuring a reliability.

As described above, according to the present invention, the lift-off process is employed to eliminate the mask process for the third conductive layer. Accordingly, the thin film transistor substrate is fabricated by the three-round mask process, so that the fabrication process can simplified to reduce the manufacturing cost and improve the production yield. Furthermore, according to embodiments of the present invention, the pixel hole and the first to third contact holes going through the protective film are used as a stripper infiltration paths, so that a lift-off ability of the photo-resist pattern covered with the third conductive layer can be effectively improved. Moreover, according to the present invention, the pixel electrode is provided within the pixel hole passing through only the protective film, so that the edge thereof can have a low step coverage to prevent a light-leakage caused by high step coverage of the pixel electrode.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A thin film transistor substrate of horizontal electric field type liquid crystal display device, comprising:
   a gate line and a common line arranged in parallel on a substrate and formed from a first conductive layer;

a data line formed from a second conductive layer, the data line crossing the gate line and the common line having a gate insulating film therebetween such that the data line, the gate line and the common line define a pixel area;
a thin film transistor having a gate connected to the gate line and a source electrode connected to the data line;
a common electrode extending from the common line into the pixel area and formed from the first conductive layer;
a protective film for covering a plurality of signal lines and electrodes and the thin film transistor;
a pixel hole which passes through the protective film and a drain electrode of the thin film transistor to expose an upper surface of the gate insulating film and a side surface of the drain electrode, and has an elongated shape that parallels the common electrode; and
a pixel electrode contacted with the upper surface of the gate insulating film and the side surface of the drain electrode in the pixel hole and formed from a third conductive layer within the pixel hole without being formed on an upper surface of the protection film.

2. The thin film transistor substrate according to claim 1, further comprising a gate pad, wherein the gate pad includes:
a lower gate pad electrode extended from the gate line,
a first contact hole passing through the protective film and the gate insulating film to expose the lower gate pad electrode, and
an upper gate pad electrode formed from the third conductive layer within the first contact hole.

3. The thin film transistor substrate according to claim 2, further comprising a common pad, wherein the common pad includes:
a lower common pad electrode extended from the common line,
a second contact hole passing through the protective film and the gate insulating film to expose the lower common pad electrode, and
an upper common pad electrode formed from the third conductive layer within the second contact hole.

4. The thin film transistor substrate according to claim 3, further comprising a data pad, wherein the data pad includes:
a lower data pad electrode extended from the data line,
a third contact hole passing through the protective film and the lower data pad electrode, and
an upper data pad electrode formed from the third conductive layer within the third contact hole and connected, on a side surface basis, to the lower data pad electrode.

5. The thin film transistor substrate according to claim 4, wherein the pixel electrode, the upper gate pad electrode, the upper common pad electrode and the upper data pad electrode make an interface with the protective film within the corresponding contact holes.

6. The thin film transistor substrate according to claim 4, further comprising a storage capacitor, wherein the storage capacitor includes:
a first lower storage electrode included in the gate line,
a second lower storage electrode included in the common line adjacent to the gate line, and
an upper storage electrode connected, on a side surface basis, to the pixel electrode and connected to the first and second lower storage electrodes having the gate insulating film therebetween.

7. The thin film transistor substrate according to claims 6, wherein a semiconductor layer of the thin film transistor overlaps any one of the data line, the lower data pad electrode and the upper storage electrode.

* * * * *